United States Patent [19]
Funazaki

[11] Patent Number: 6,130,758
[45] Date of Patent: Oct. 10, 2000

[54] PRINTER SYSTEM AND METHOD OF CONTROLLING OPERATION OF THE SAME

[75] Inventor: Fumihiro Funazaki, Asaka, Japan

[73] Assignee: Fuji Photo Film Co., Ltd., Kanagawa, Japan

[21] Appl. No.: 08/944,978

[22] Filed: Oct. 7, 1997

[30] Foreign Application Priority Data

Oct. 7, 1996 [JP] Japan .................................... 8-282881

[51] Int. Cl.⁷ .................................................. G06F 15/00
[52] U.S. Cl. ......................... 358/1.15; 358/1.13; 710/3; 710/4; 710/25
[58] Field of Search .................................... 395/108, 112, 395/113, 114, 115, 116, 117; 358/1.8, 1.13, 1.14, 1.15, 1.16, 1.17, 1.18, 405, 407; 710/3, 4, 9, 21, 25, 26, 58

[56] References Cited

U.S. PATENT DOCUMENTS

| | | | |
|---|---|---|---|
| 5,586,227 | 12/1996 | Kawana | 395/112 |
| 5,703,628 | 12/1997 | Nishiyama | 395/115 |
| 5,754,789 | 5/1998 | Nowatzyk et al. | 395/200.63 |
| 5,815,678 | 9/1998 | Hoffman et al. | 395/309 |
| 5,911,152 | 6/1999 | Wooten | 711/208 |
| 5,940,600 | 8/1999 | Staats et al. | 395/287 |

Primary Examiner—Edward L. Coles
Assistant Examiner—Mark Wallerson

[57] ABSTRACT

A printer system includes a printer controller and a printer connected to each other by a cable according to IEEE Standard 1394. The printer controller and the printer each accepts data transmitted thereto when device identification data assigned thereto agrees with transmission destination identifying data accompanying the transmitted data. The printer controller and the printer are assigned identical device identification data. The printer controller and printer decide a first transmission-permitted time period in which the printer controller transmits data to the printer and a second transmission-permitted time period in which the printer transmits data to the printer controller. The first and second transmission-permitted time periods are separated from each other. The printer controller transmits image data accompanied by the transmission destination identifying data to the printer in packet units in the first transmission-permitted time period. The printer transmits data accompanied by the transmission destination identifying data to the printer controller in the second transmission-permitted time period.

29 Claims, 17 Drawing Sheets

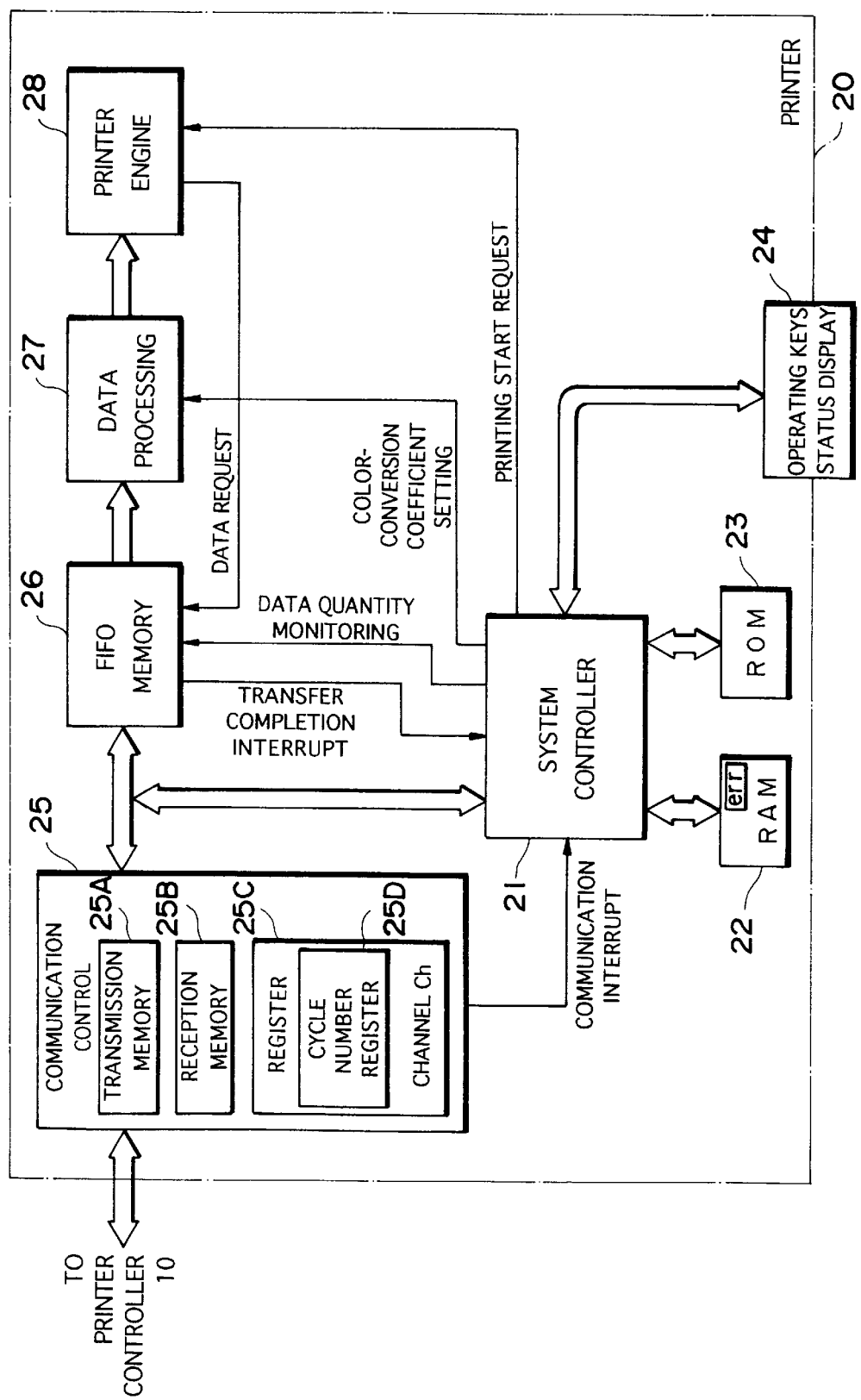

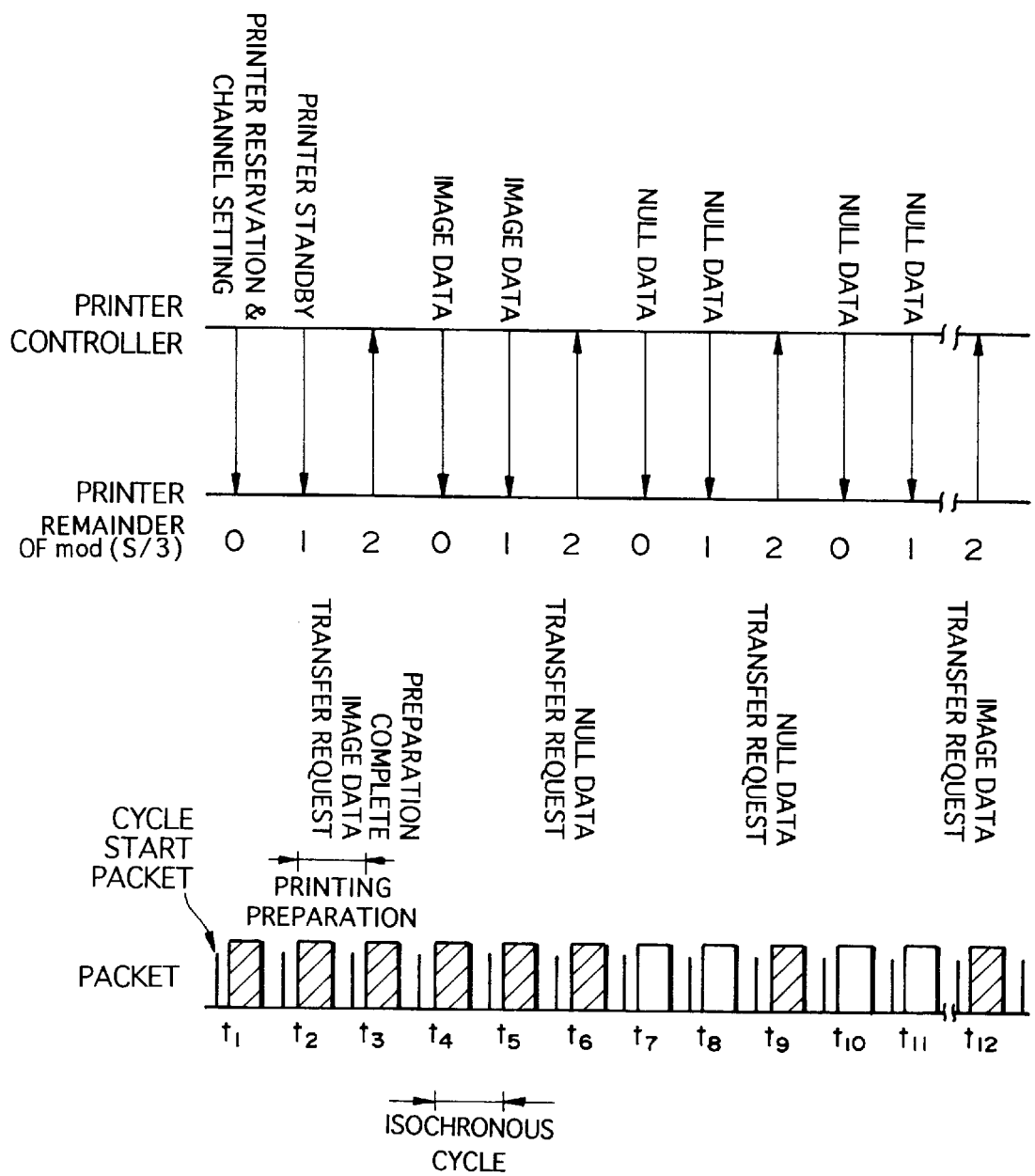

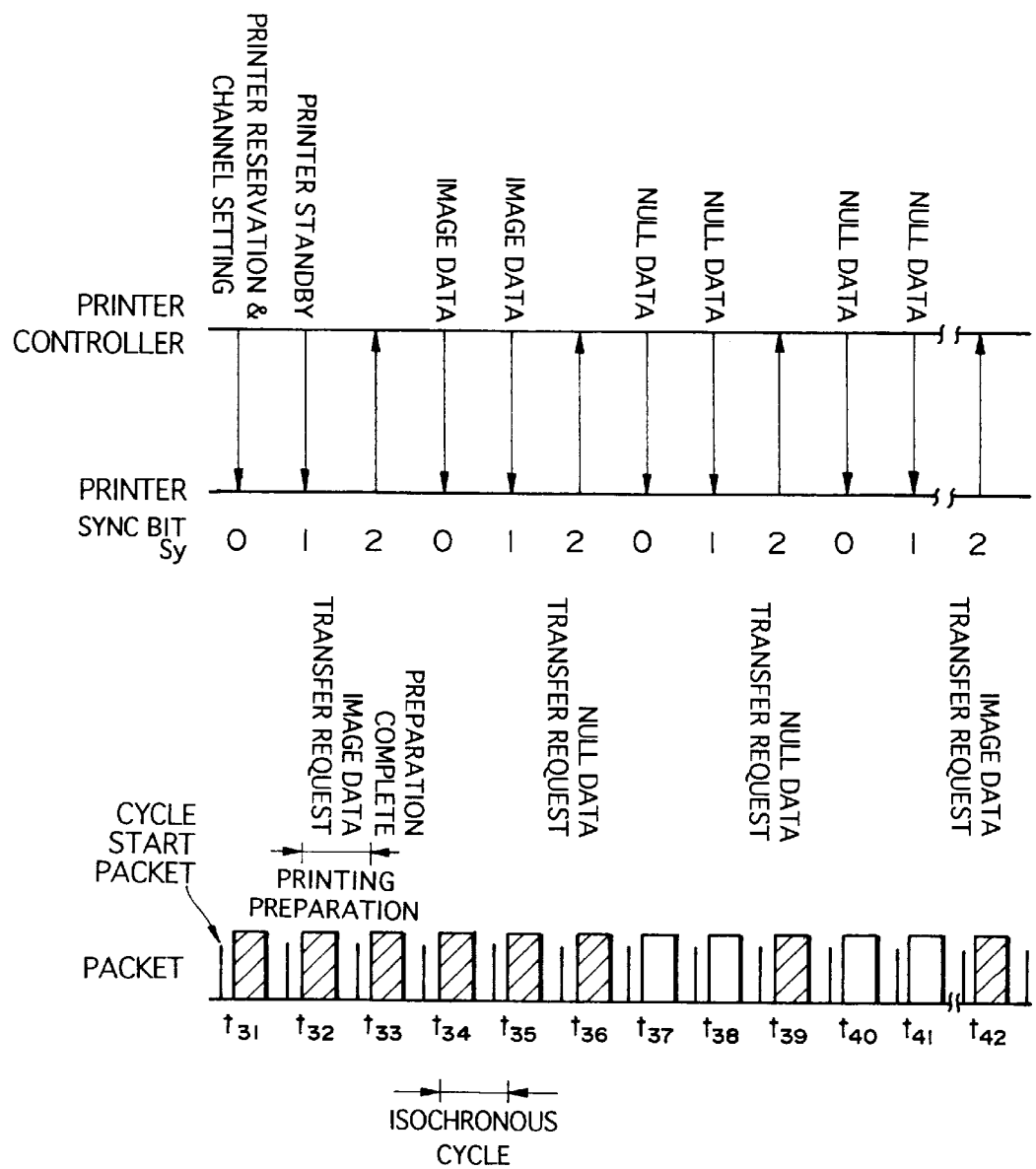

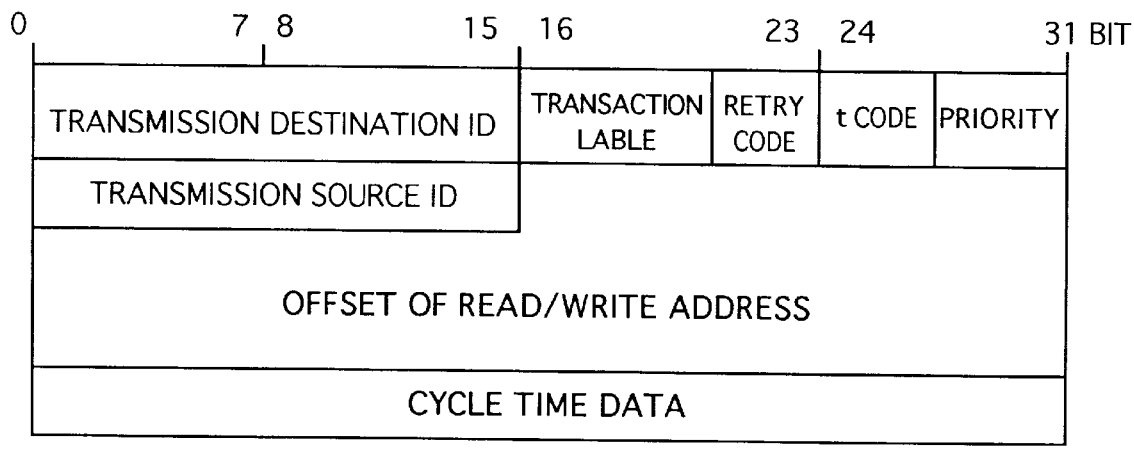
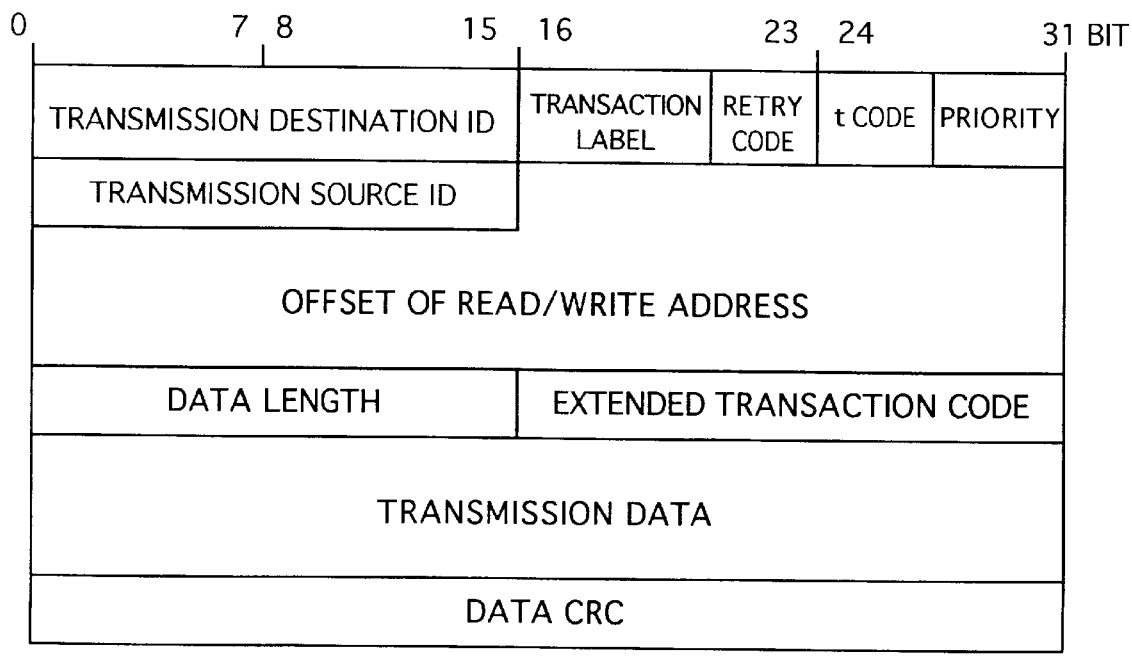

ISOCHRONOUS COMMAND PACKET FORMAT

ISOCHRONOUS DATA PACKET FORMAT

6,130,758

PRINTER SYSTEM AND METHOD OF CONTROLLING OPERATION OF THE SAME

BACKGROUND OF THE INVENTION

1. Field of the Invention

The present invention relates to a printer system comprising a printer controller and a printer connected to each other by a bus. The printer controller and the printer each accepts data transmitted thereto when device identification data assigned thereto agrees with transmission destination identifying data accompanying the transmitted data. The present invention further relates to the printer and printer controller that construct the printer system. The present invention relates to a method of controlling the operation of the printer system, a method of controlling the operation of the printer and a method of controlling the operation of the printer controller.

2. Description of the Related Art

Parallel communication using a Centronics interface or an SCSI (Small Computer System Interface) and serial communication using an RS232C, RS422 or USB (Universal Serial Bus) are utilized to transmit image data from a printer controller to a printer. In a case where a plurality of devices are connected to a communication passage (path) (irrespective of whether the passage is a line or a bus), device identification data is assigned to each of devices and data to be transmitted is accompanied with transmission destination identifying data which is usually the same as the device identification data. The device identification data for each device must be different from one another.

SUMMARY OF THE INVENTION

The object of the present invention is to make it possible to assign identical device identification data (transmission destination identifying data) to both a printer controller and a printer which communicate to each other through a communication passage.

In order to supply a printer with image data from a printer controller, the present invention preferably utilizes IEEE (Institute of Electrical and Electronic Engineers, Inc.) Standard 1394 for high-speed serial transmission. With IEEE Standard 1394, which is currently under consideration in the art, isochronous transfer and asynchronous transfer are possible.

With isochronous transfer, data referred to as cycle-start packet data is in principle generated at an isochronous cycle (125 µs) by any of a plurality of nodes connected by a bus. Data is transmitted from a certain node (this node is a cycle master, as will be described later) to another node every isochronous cycle. Isochronous transfer, which makes it possible to perform data transmission without fail within the isochronous cycle, transmits data unilaterally from the transmitter to the receiver. Asynchronous transfer is such that when the receiver receives transmitted data, a signal indicating that the data has been received is sent back to the transmitter.

The present invention provides a printer system comprising a printer controller and a printer connected to each other by a bus, wherein the printer controller and the printer each accepts data transmitted thereto when device identification data assigned thereto agrees with transmission destination identifying data accompanying the transmitted data.

The printer controller and the printer are assigned identical device identification data. The printer controller and the printer decide a first transmission-permitted time period in which the printer controller transmits data to the printer and a second transmission-permitted time period in which the printer transmits data to the printer controller. The first and second transmission-permitted time periods are separated from each other.

The printer controller includes an image-data transmission controller which transmits image data accompanied by the transmission destination identifying data to the printer in packet units in the first transmission-permitted time period.

The printer includes a data transmission controller which transmits data accompanied by the transmission destination identifying data to the printer controller in the second transmission-permitted time period, an image data reception controller which receives the image data transmitted from the printer controller, a buffer memory temporarily storing the image data received by said image data reception controller, and a printing controller reading out the image data that has been stored in said buffer memory, and printing an image which is represented by the read-out image data.

The present invention further provides a method of controlling operation suited to the above printer system. That is, it provides a method of controlling operation of the printer system including the printer controller and the printer connected to each other by the bus.

The method comprises the steps of assigning identical device identification data to the printer controller and the printer; deciding a first transmission-permitted time period in which the printer controller transmits data to the printer and a second transmission-permitted time period in which the printer transmits data to the printer controller, the first and second transmission-permitted time periods being separated from each other; causing the printer controller to transmit image data accompanied by the transmission destination identifying data to the printer in packet units in the first transmission-permitted time period; and causing the printer to transmit data accompanied by the transmission destination identifying data to the printer controller in the second transmission-permitted time period, to receive the image data transmitted from the printer controller to store temporarily the received image data into a buffer memory, and to read out the image data that has been stored in the buffer memory and to print an image which is represented by the read-out image data.

According to the present invention, the first transmission-permitted time period for the printer controller and the second transmission-permitted time period for the printer are so determined that these time periods are separated from each other, but are not overlapped with each other. The image data is transmitted from the printer controller to the printer in the first transmission-permitted time period, and data is transmitted from the printer to the printer controller in the second transmission-permitted time period.

Accordingly, the printer controller and the printer can transmit and receive data accompanied with the transmission destination identifying data through a communication passage bidirectionally, even though the same device identification data which serves as the transmission destination identifying data is assigned to both the printer controller and the printer.

In a case where the present invention utilizes IEEE Standard 1394, the device identification data and the transmission destination identifying data are a channel number used in isochronous transfer. That is, the same channel number is assigned to both the printer controller and the printer. It is possible to save the number of channels which would be occupied by the printer controller and the printer.

The printer controller and the printer can communicate bidirectionally with each other through even one channel.

In one embodiment of the present invention, the printer controller and the printer count a number of cycles for each predetermined communication cycle from predetermined time and decide the first and the second transmission-permitted time periods based on the counted number of cycles, respectively.

Specifically, the printer controller and the printer decide the first and the second transmission-permitted time periods based on a remainder obtained by dividing the counted number of cycles by a predetermined number.

In another embodiment of the present invention, the printer controller transmits first sync data indicating that transmission of image data will be stopped when the printer controller will pause to transmit image data, and the printer transmits second sync data indicating that transmission of data will be stopped when the printer will pause to transmit data.

The printer decides the second transmission-permitted time period in such a way that the printer starts to transmit data in response to the first sync data, and the printer controller decides the first transmission-permitted time period in such a way that the printer controller starts to transmit image data in response to the second sync data.

It is preferable that the printer controller controls the transmission of the image data based on data sent from the printer.

For example, the printer controller re-transmits the image data which has been transmitted to the printer once in response to an image data repeat request sent from the printer.

A printing error occurs when the image data transmitted from the printer controller includes an error. The printer is allowed to print using correct image data which does not include the error and re-transmitted from the printer controller in response to the image data repeat request sent from the printer. Thus the printing error is prevented from occurring.

Another example is that the printer controller transmits image data in response to an image data transfer request sent from the printer.

The printer can request image data when necessary, since the printer controller transmits image data in response to the image data transfer request sent from the printer. Accordingly, a storage capacity of the buffer memory of the printer can be reduced.

Still another example is that the printer controller stops transmission of image data in response to an image data transfer stop request sent from the printer.

The printer sends the image data transfer stop request when, for example, a printing error occurs. The printer controller pauses transmission of the image data to the printer.

Still another example is that the printer controller transmits null data (that is, a packet includes no image data) in response to a null data transfer request sent from the printer.

The printer is allowed to send the null data transfer request so that the printer can adjust a quantity of image data stored in the buffer memory to prevent the image data from overflowing from the buffer memory.

The buffer memory of the printer may possess an image-data storage capacity smaller than a quantity of image data representing one frame of the image.

It is preferred that the printer controller repeats transmission of image data to the printer in packet units in such a manner that the image data that has been stored in the buffer memory will not be emptied from the buffer memory. In this case, printing controller can read out the image data that has been stored in the buffer memory, and print the image, which is represented by the read-out image data, at a constant speed.

The present invention further provides a printer controller as such and a printer as such, which constitute the above printer system.

The printer controller and the printer may be replaced with a first device and a second device, respectively, to generalize the printer system and to construct a general system comprising the first and second devices connected each other.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a block diagram illustrating the electrical configuration of a printer;

FIGS. 3a and 3b are time charts for a case in which image data is transmitted from the printer controller to the printer;

FIGS. 6a and 6b are time charts for a case in which image data is transmitted from the printer controller to the printer;

FIG. 12 illustrates the format of a cycle-start packet;

FIG. 13 illustrates the packet format of data transferred isochronously;

DESCRIPTION OF THE PREFERRED EMBODIMENTS (1) Data transfer based upon IEEE Standard 1394

Before describing a printer system according to embodiments of the present invention, a data transfer based upon IEEE Standard 1394 will be discussed.

Figure 9:
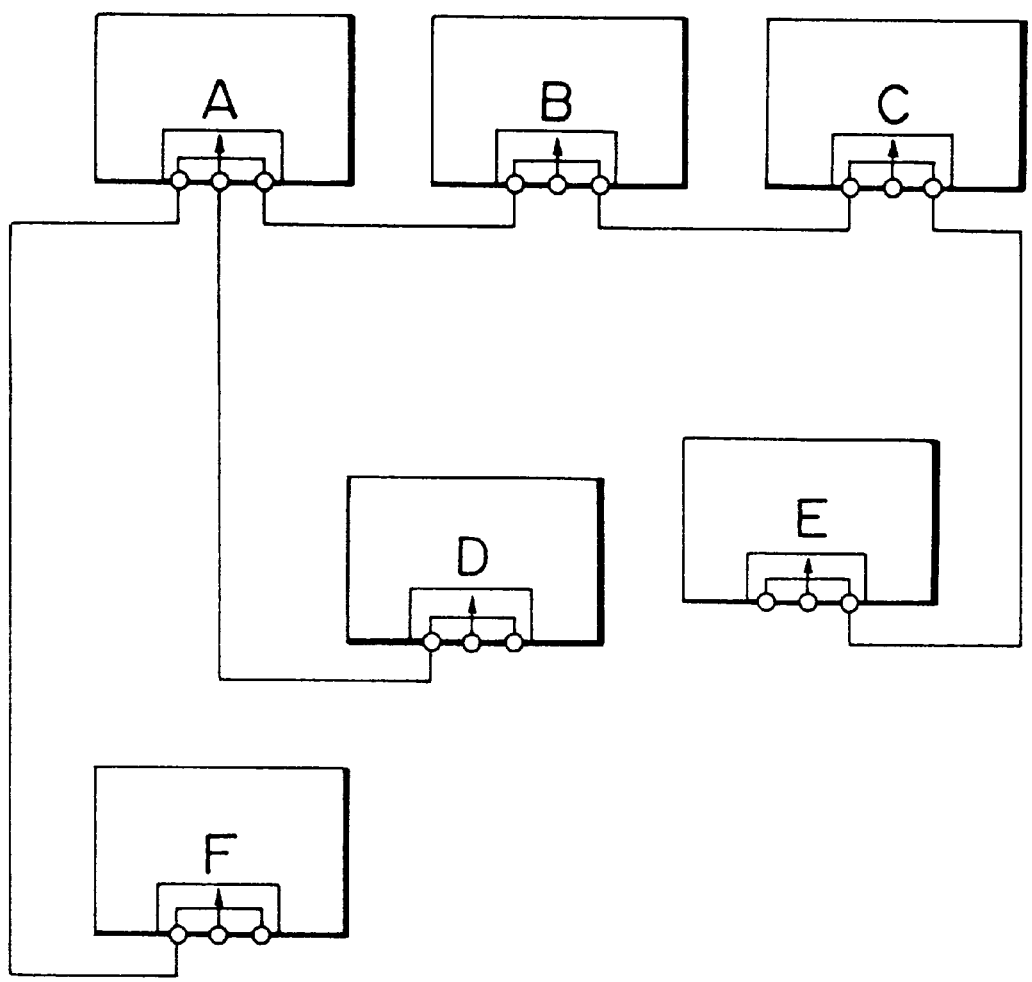
FIG. 9 is a block diagram of devices connected in accordance with IEEE Standard 1394.

FIG. 9 illustrates the manner in which a plurality of devices (a computer, a printer, a digital video tape recorder, etc.) A, B, C, D, E and F are connected using a bus. Each device has one or a plurality of ports (in the example of FIG. 9, all devices have three ports). It is possible to connect a maximum of 63 devices by connecting the ports of the devices. According to IEEE Standard 1394, devices can be connected as long as the number of devices connected to a daisy chain does not exceed 16. There are no loop connections.

Further, according to IEEE standard 1394, two types of data transfer are possible, namely isochronous transfer and asynchronous transfer. Data transfer is performed in packet units in both isochronous transfer and asynchronous transfer.

FIG. 12 illustrates the format of a cycle-start packet. The cycle-start packet data represents the start of an isochronous cycle (which cycle or period, in principle, has a duration of 125 $\mu$s) and is transmitted from a cycle master by isochronous transfer, as will be described later.

The cycle-start packet includes the ID of the transmission destination (the ID is specific to the device), a transaction label, a retry code, a t-code indicative of asynchronous transfer data or isochronous transfer data, priority which indicates the degree of priority of transmission data, the ID of the source of transmission, an offset of a read/write address, cycle time data and a data CRC (cyclic redundancy check).

According to IEEE standard 1394, the cycle master starts measuring time from the moment the power supply is turned on. As mentioned above, the cycle-start packet is in principle output every 125 $\mu$s but a delay is also allowed. The delay time is referred to as "cycle-start delay time"$\Delta$t. The cycle time data include data representing the time measured in the cycle master and data representing the cycle-start delay time.

An asynchronous data packet format shown in FIG. 13 is used in a case where data is transmitted by asynchronous transfer. This format differs from the format of the cycle-start packet format only in that data length, an extended transaction code and transmission data are included in place of the cycle time data.

In a case where there are two or more control devices which control one device to undergo control, it is possible for only one control device to control the device to be controlled. This is referred to as "exclusive control". An extended transaction code is employed to specify an arithmetic operation used to check whether or not exclusive control is being carried out.

Figure 14:
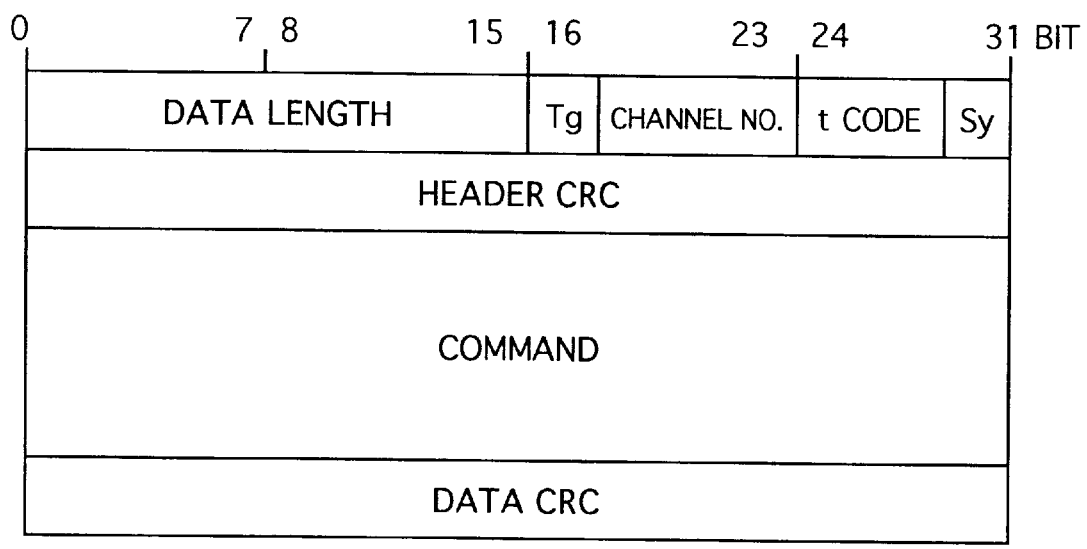
FIG. 14 illustrates the format of an isochronous command packet.
Figure 15:
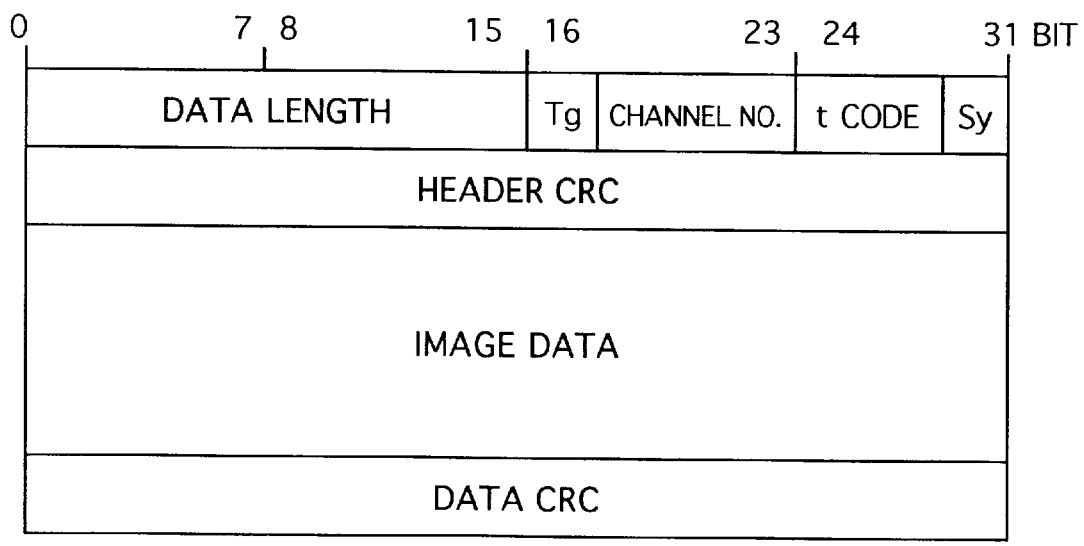
FIG. 15 illustrates the format of an isochronous data packet.

FIGS. 14 and 15 illustrate the formats of packets used in isochronous transfer. FIG. 14 illustrates the format of an isochronous command packet used in a case where a command is transmitted, and FIG. 15 illustrates the format of an isochronous data packet used in a case where data (e.g., image data) is transmitted.

The packet formats include data length indicating the length of the data, a channel number assigned to a command or (image) data, a t-code, Sy, which serves as a synchronizing bit, a header CRC, which is an error detection code for detection of an error in the data from the data length to the synchronizing bit Sy, a command or (image) data, and data CRC, which is an error detection code for detection of an error in the command or (image) data. In isochronous transfer, a channel number is assigned to each device and, when the channel number assigned to a device and the channel number included in the transmitted packet agree, the device having the assigned channel number that agrees with the channel number of the transmitted packet fetches the transmitted command or (image) data. Further, "00" is recorded as Tg since the purpose of use is not specified according to the stipulation of the currently prevailing IEEE Standard 1394.

With reference again to FIG. 9, a master-slave relationship between the devices connected by the bus is decided in IEEE standard 1394. A method of deciding this master-slave relationship will now be described.

When the power supply of each device is turned on, a certain device makes an inquiry of another device regarding the master-slave relationship between them. The device that make the master-slave inquiry is the slave and the device that receives the master-slave inquiry is the master.

Figure 10:
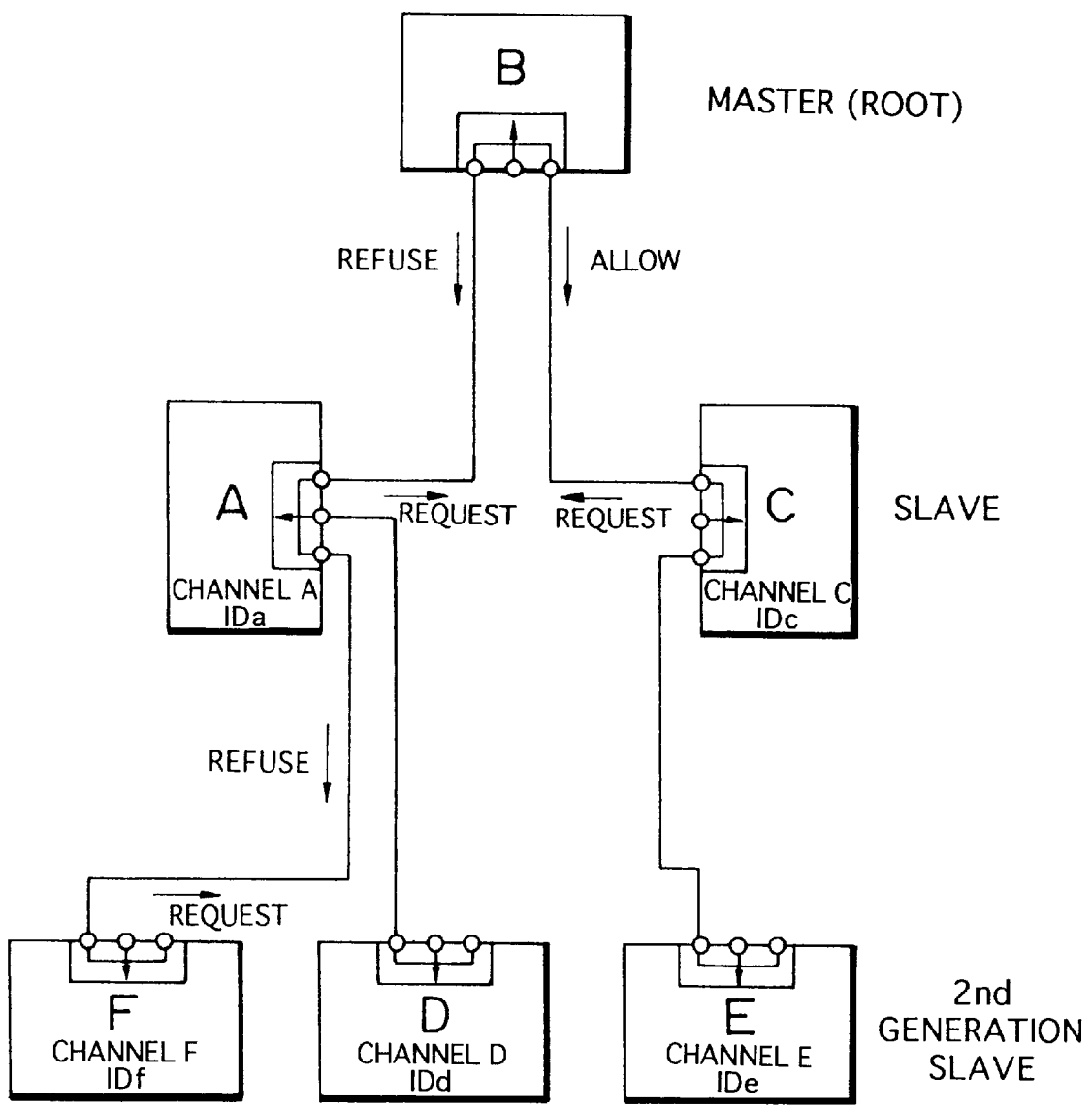
FIG. 10 is a block diagram of devices, which have been connected in accordance with IEEE Standard 1394, arranged in the form of a tree structure.

When the master-slave relationship has been decided for all of the devices, the overall connection configuration takes on a tree structure, as shown in FIG. 10. In the example illustrated in FIG. 10, the device B is the master (the root). The devices A and C are the slaves of the device B, the devices D and F are the slaves of the device A (a second generation of slaves as seen from the device B), and the device E is the slave of the device C (a second-generation slave as seen from the device B).

According to IEEE Standard 1394, each device is assigned a channel number in order to receive the data of an isochronous transfer, and each device is assigned an ID in order to receive the data of an asynchronous transfer, as mentioned above. In the illustrated example, Channel No. A and IDa have been assigned to the device A, Channel No. B and IDb to the device B, Channel No. C and IDc to the device C, Channel No. D and IDd to the device D, Channel No. E and IDe to the device E, and channel No. F and IDf to the device F.

Figure 11:
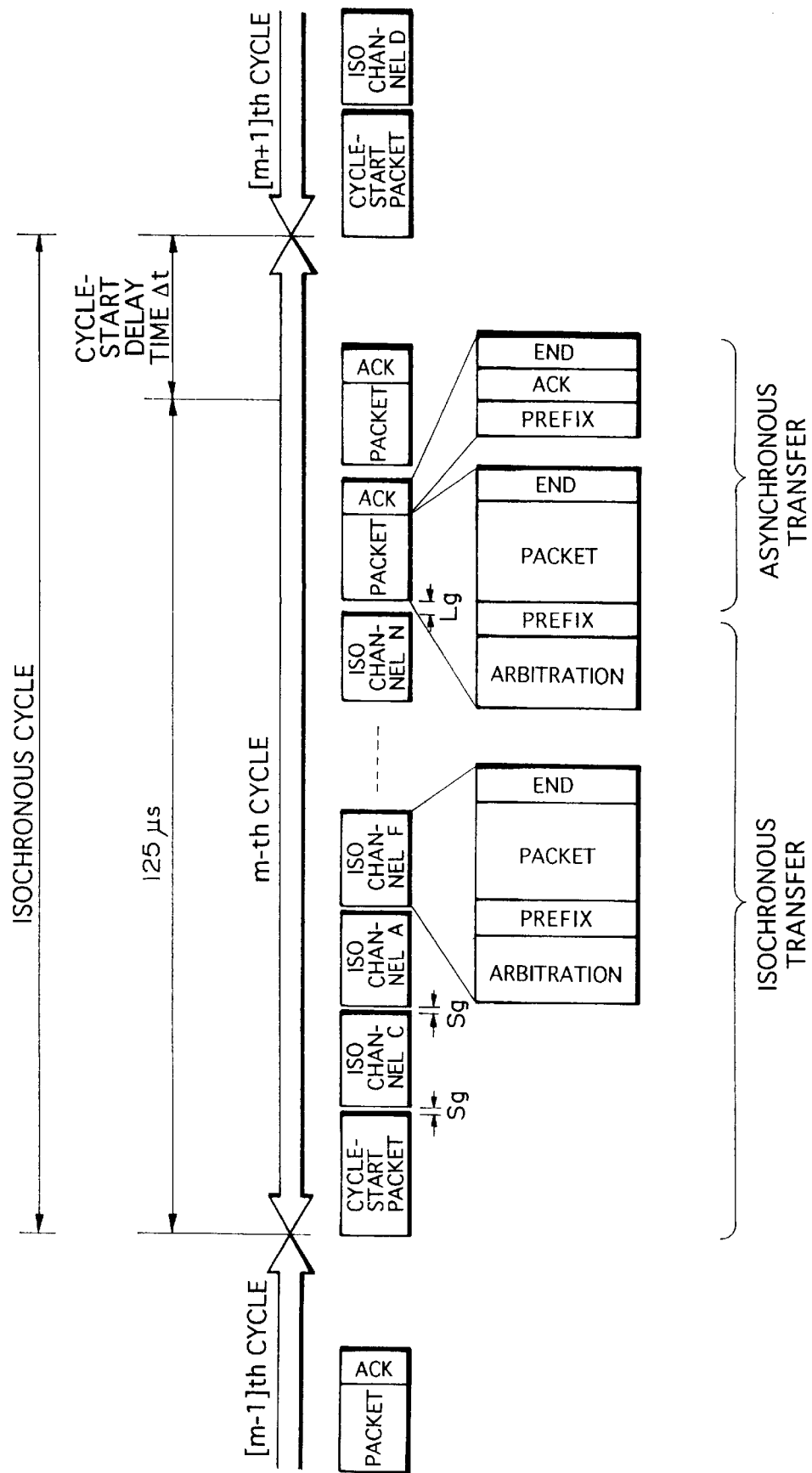
FIG. 11 is a time chart of isochronous transfer.

FIG. 11 is a time chart of isochronous transfer. The isochronous cycle is roughly divided into an isochronous transfer period and an asynchronous transfer period. Further, there is a time period of a long gap (Lg) between the isochronous transfer period and the asynchronous transfer period.

Control of isochronous transfer is performed by the device referred to as the cycle master. The root is the cycle master.

An isochronous cycle starts in response to output of the cycle-start packet from the cycle master (root). The cycle-start packet is applied to all devices (inclusive of second-generation devices) that have been connected to the root.

The transfer of isochronous data starts after transmission of the cycle-start packet.

Upon elapse of a first time period (the time period of the short gap) Sg following transmission of the cycle-start packet, arbitration is carried out among all devices that wish to perform an isochronous transfer. Arbitration involves receiving permission to use the bus and is performed in the following manner:

First, signals requesting use of the bus are transmitted to a master device from the devices attempting to conduct the isochronous transfer. A device that has received the request signal relays the request signal to its master device. As a result, request signals from all of the devices that wish to perform an isochronous transfer reach the cycle master. Which device should be given priority to make use of the bus has been stored in the cycle master. The device which can use the bus is decided at elapse of the short gap Sg in accordance with the stored order of priority. The cycle master outputs a signal, which allows use of the bus, solely to the decided device at the elapse of the short gap Sg. A signal refusing use of the bus is transmitted from the cycle master to the other devices at the elapse of the short gap Sg.

The device that has received the signal allowing use of the bus is capable of transmitting data.

In the example of FIG. 10, signals requesting use of the bus are transmitted from the devices A, C and F, and these request signals are received by the device B serving as the root. A signal allowing use of the bus is transmitted from the root device B to the device C, thereby making it possible for the device C to transmit data. Signals refusing use of the bus are transmitted to the devices A and F. As a result of this the devices A and F become incapable of transmitting data at this time. The devices A and F perform arbitration again after the device C transmits one packet of data, and transmit data upon receiving the signal allowing use of the bus.

With reference again to FIG. 11, the isochronous transfer data is transmitted in packet units from the device that has obtained the right to bus use at elapse of the short gap Sg following the transmission of the cycle-start packet. Prefix data representing the beginning of data is added on in front of the data in the packet of isochronous transfer data (having the format shown in FIG. 14 or FIG. 15), and end data representing the end of data is added on to follow the packet.

The end data is fetched into all of the devices, as a result of which all of the devices recognize that the bus is idle. A device that wishes to transmit isochronous transfer data at elapse of the short gap Sg following reception of the end data again transmits the signal requesting use of the bus, i.e., performs arbitration again, in the manner described above (once a device has obtained the right to bus use in the time period of the isochronous cycle, this device does not output the request signal again in this isochronous cycle. All devices that perform an isochronous transfer are capable of transmitting one packet of data at any point in time within the isochronous cycle).

When an isochronous transfer is completed in the isochronous transfer period, acquiring of the right to use the bus for an asynchronous transfer is conducted at the moment a second time period (the long gap Lg) elapses. The data of the asynchronous transfer is transmitted in packet units from the device that has acquired the right to bus use. In this asynchronous transfer, the prefix data representing the beginning of data is also attached in front of the packet and the end data is attached to follow the packet. In the asynchronous transfer, the receiving device in the asynchronous transfer outputs acknowledge data ACK, which indicates the fact that reception has taken place, to the device that transmitted the asynchronous transfer data. Prefix data and end data are added on in front and in back of this acknowledge data as well.

(2) Printer system

In the isochronous transfer, as described above, a channel number (transmission destination identifying data) for specifying the transmission destination is added to the data (command) subjected to the isochronous transfer. Only the device having the channel number identical to the channel number added to the data receives to fetch the isochronous-transferred data. The same channel number is, generally, never assigned to a plurality of different devices which are connected to one another to a cable (bus) for the IEEE standard 1394. This is because the data transmission destination would be confused, if the same number were assigned to the plurality of devices.

In a printer system according to this embodiment, the same channel number (device identification data) is assigned to a printer 20 and a printer controller 10 which constitute a printer system to realize data transmission and reception between the printer controller 10 and the printer 20 using the isochronous transfer. Accordingly, the channel number can be saved by one.

The printer system according to this embodiment is constructed by interconnecting t he printer 20 and the printer controller 10, which controls printing by the printer 20, by a cable (bus) that conforms to the IEEE Standard 1394.

Figure 1:
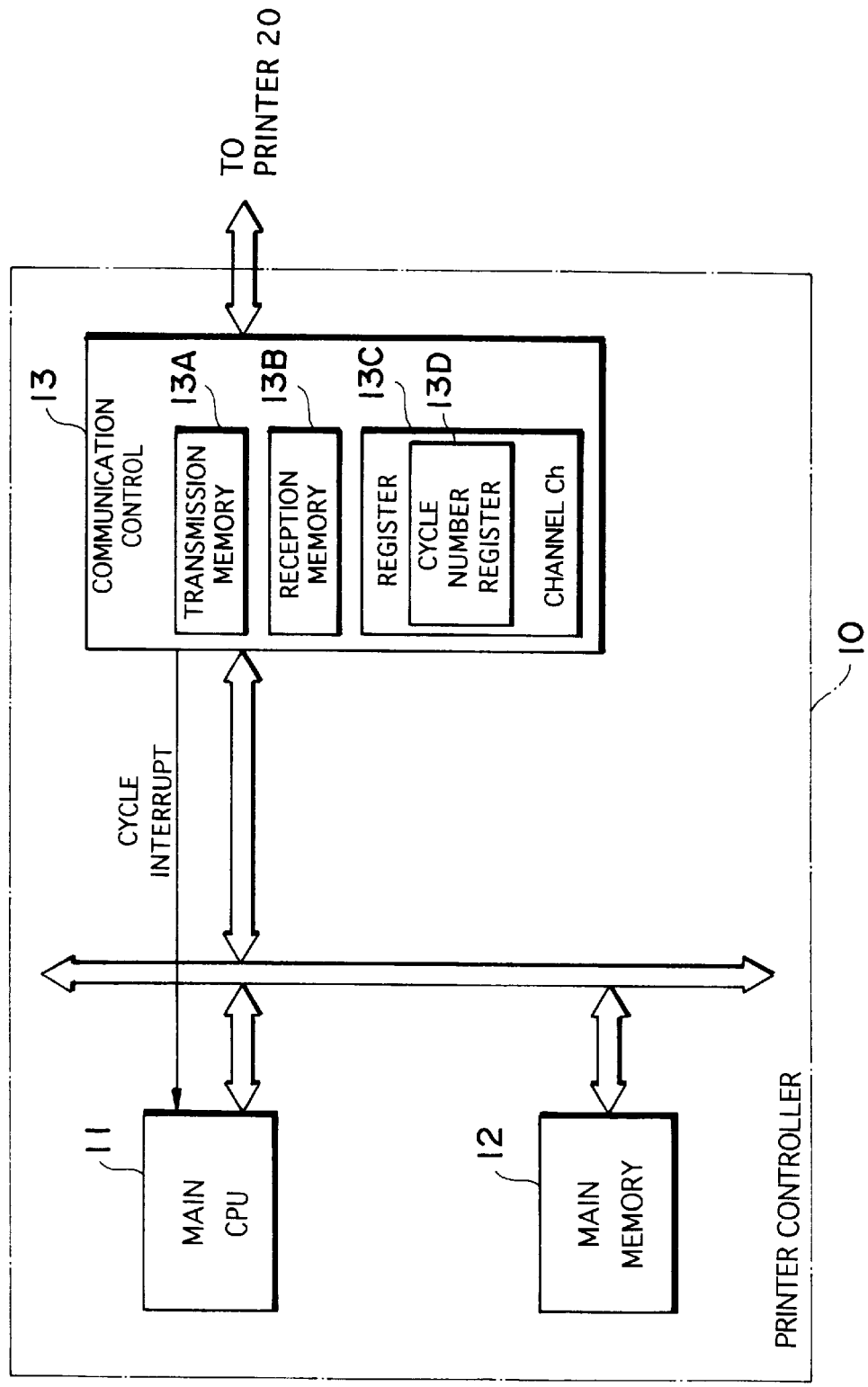
FIG. 1 is a block diagram illustrating the electrical configuration of a printer controller.

FIG. 1 is a block diagram illustrating the electrical configuration of the printer controller 10.

The overall operation of the printer controller 10 is supervised by a main CPU 11. The controller 10 includes a main memory 12 in which are stored a program for operating the printer controller 10, image data which is to be transmitted to the printer 20 and represents images to be printed by the printer 20, and other data. The printer controller 10 further includes a communication control circuit 13 for carrying out an isochronous transfer and an asynchronous transfer. The communication control circuit 13 includes a transmission memory 13A for temporarily storing one packet of data to be transmitted, a reception memory 13B for temporarily storing one packet of data that has been transmitted from the printer 20, and a register 13C for storing data presenting the ID of the printer controller 10 and data representing the channel number Ch. The register 13C includes a cycle number register 13D counting the number-of-times of the isochronous cycles. When an isochronous transfer is carried out, the communication control circuit 13 interrupts the main CPU 11 for each isochronous cycle. The main CPU 11 responds to the interrupt by reading the image data out of the main memory 12.

FIG. 2 is a block diagram illustrating the electrical configuration of the printer 20.

The overall operation of the printer 20 is supervised by a system controller 21. Connected to the system controller 21 are a RAM 22 for temporarily storing data such as data representing the current status (inclusive of whether or not printing paper exists) of the printer 20, and a ROM 23 which stores the program that operates the printer 20, printer specifications data which includes the printing speed of the printer 20 and the storage capacities of a transmission memory 25A, reception memory 25B and FIFO (first-in first-out) memory 26, and other data as well. The RAM 22 is provided with an error flag which is set to "1" when an error is found in the data transmitted from the printer controller 10. The printer 20 further includes operating keys and a status display circuit 24. A signal representing a setting made by the operating keys is applied to the system controller 21, and the status of the printer 20 is displayed by the status display circuit 24.

The printer 20 also includes a communication control circuit 25 for performing the above-described isochronous transfer and asynchronous transfer. The communication control circuit 25 includes the transmission memory 25A for temporarily storing one packet of data to be transmitted, the reception memory 25B for temporarily storing one packet of data that has been transmitted from the printer controller 10, and a register 25C for storing data representing the ID of the printer 20 and the channel number Ch. The channel number of the printer controller 10 and the channel number of the printer 20 are the same. The register 25C includes a cycle number register 25D for counting the number-of-times of isochronous cycles. When one packet of data is received, a communication interrupt is generated in the communication control circuit 25 and is applied to the system controller 21. The received data is transferred to the FIFO memory 26 in response to the interrupt.

The printer 20 includes the FIFO memory 26. The latter has a storage capacity capable of storing image data of two lines of the print image in the printer 20. The quantity of data stored in the FIFO memory 26 is monitored by the system controller 21.

A printer engine 28 includes a printing head which starts printing in response to a printing-start request signal from the system controller 21. When the printing-start request signal from the system controller 21 is applied to the printer engine 28, the latter generates a data request signal that is applied to the FIFO memory 26. In response to the data request signal from the printer engine 28, the image data that has been stored is output from the FIFO memory 26. When image data of one line is output from the FIFO memory 26, the latter applies a transfer-completion interrupt signal to the system controller 21. As a result, the system controller 21 recognizes that image data of one line has been output from the FIFO memory 26.

The image data output by the FIFO memory 26 is applied to a data processing circuit 27, which executes data processing inclusive of color-conversion processing based upon color-conversion coefficients set by the system controller 21 to output the processed image data. The image data processed and output by the data processing circuit 27 is applied to the printer engine 28, which prints the image at a constant speed by means of the printing head included in the printer engine 28.

Figure 3B:
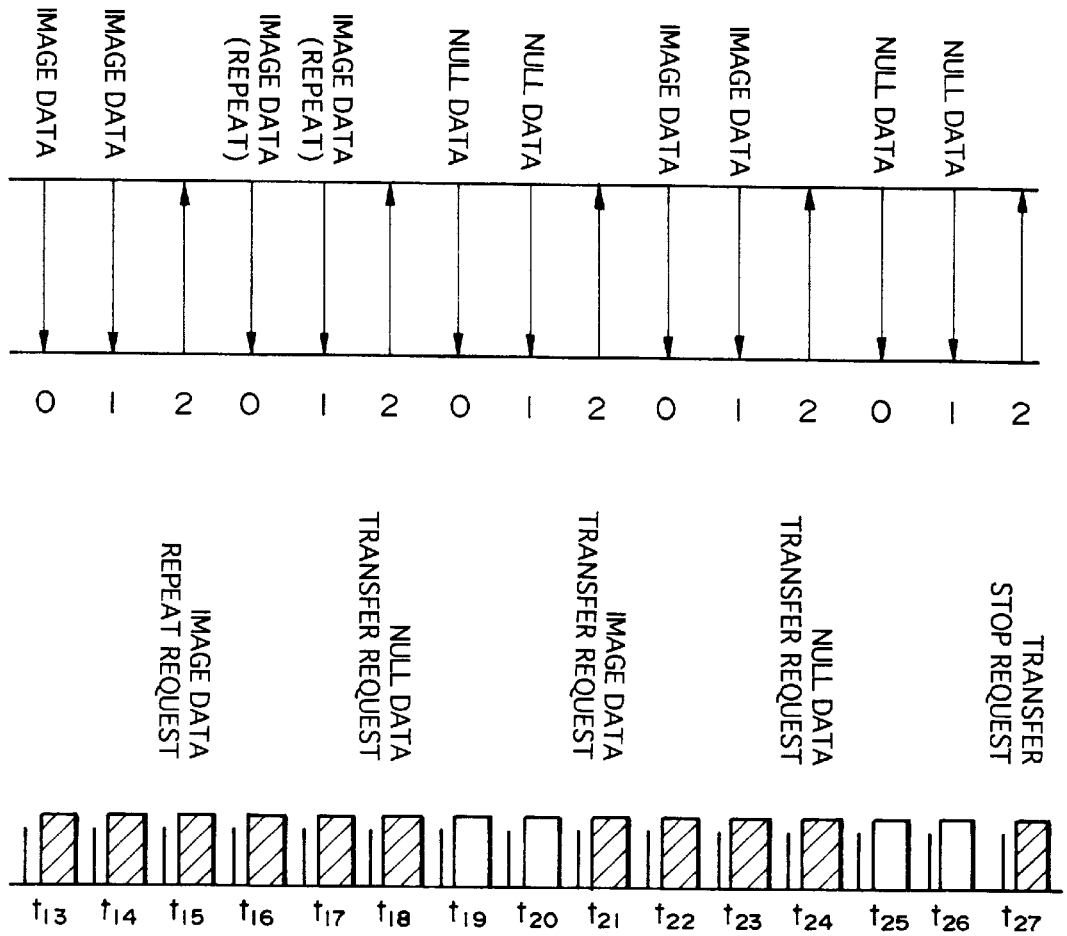
Figure 4:
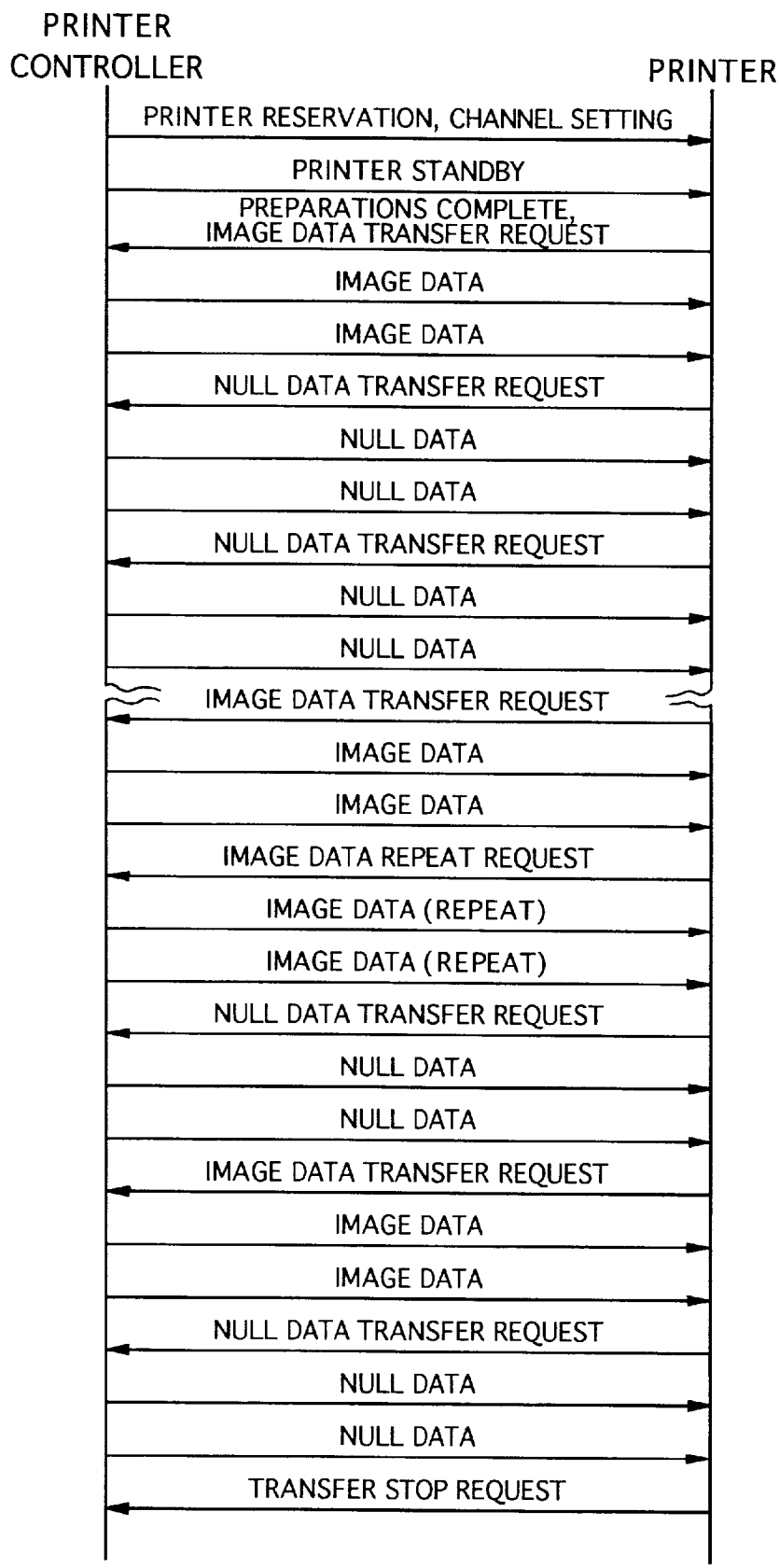
FIG. 4 illustrates commands and data sent and received by the printer controller and printer in a case where image data is transmitted from the printer controller to the printer.
Figure 5A:
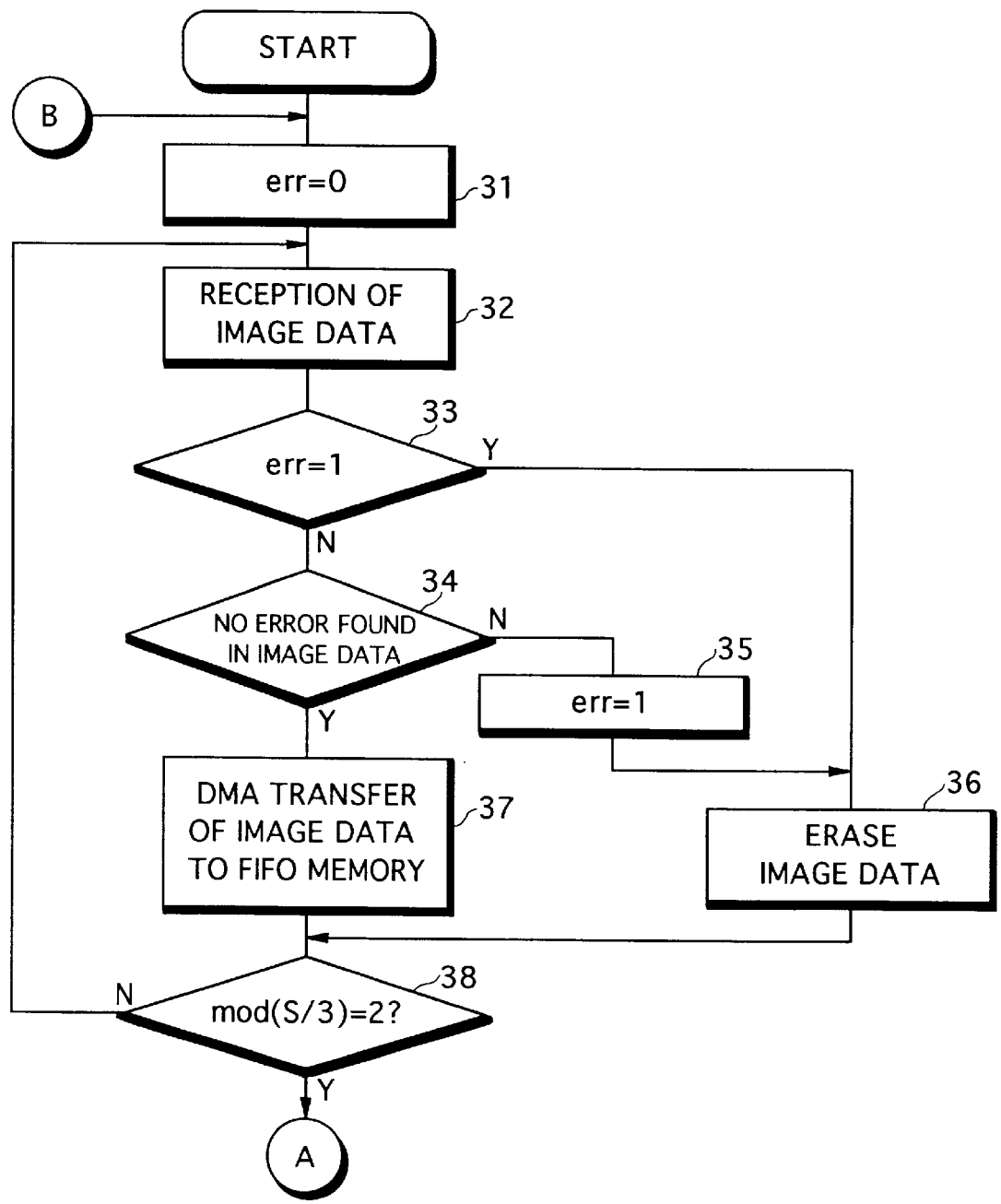
FIGS. 5a and 5b are flow charts showing an operation of the printer when image data is transmitted from the printer controller to the printer.
Figure 5B:
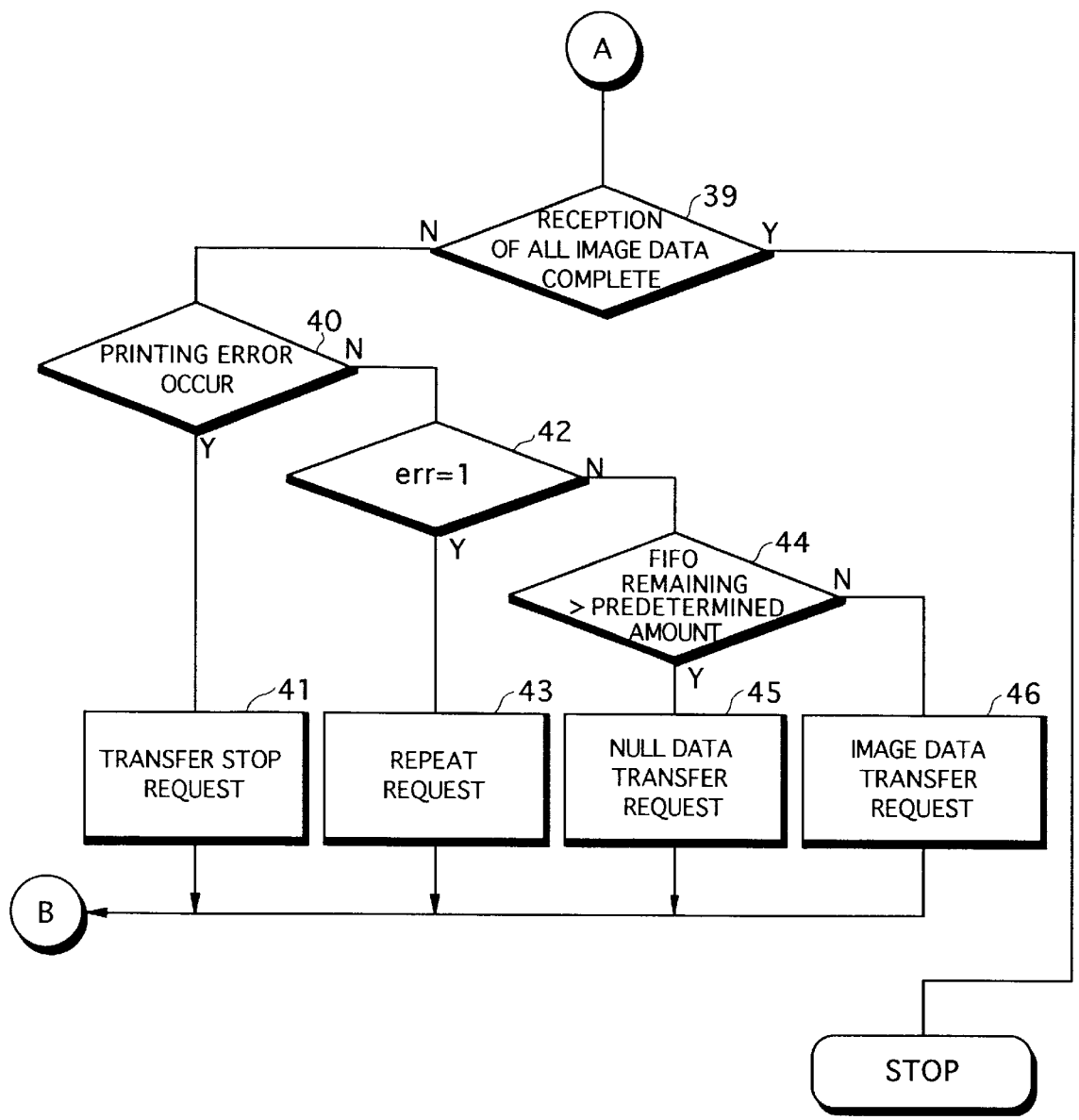

FIGS. 3a and 3b are time charts for a case in which image data is transmitted from the printer controller 10 to the printer 20 in response to a transfer request from the printer 20, and FIG. 4 illustrates the manner in which commands and data are sent and received by the printer controller 10 and printer 20. FIGS. 2a and 5b are flow charts showing an operation of the printer 20 when the image data is transmitted from the printer controller 10. It will be assumed for the sake of simplicity that one printer controller 10 and one printer 20 are connected. As exemplified in FIGS. 1 and 2, the printer controller 10 is the master (the cycle master) and the printer 20 is the slave, by way of example.

In the operation shown in FIGS. 3a to 5b, the number-of-times S1 of the isochronous cycles counted by the cycle number register 13D of the print controller 10 and the number-of-times S2 of the isochronous cycles counted by the cycle number register 25D of the printer 20 (these number-of-times S1 and the number-of-times S2 are the same number S) are respectively divided by a common number (divisor) "3" to obtain remainders in the printer controller 10 and the printer 20. It is so determined that when the remainder is "0" or "1", data transfer (transmission) from the printer controller 10 to the printer 20 is allowed, and when the remainder is "2", data (various requests) is transferred (transmitted) from the printer 20 to the print controller 10.

First, in the isochronous cycle in which the remainder is "0" or "1", a command requesting output of a ready signal is output by the printer controller 10 and the command is applied to the printer 20. When the signal requesting output of the ready signal is received by the printer 20, the system controller 21 refers to the RAM 22 and outputs a ready signal if the ready state has been attained in the isochronous cycle with the remainder of "2". Upon receiving the ready signal, the printer controller 10 outputs a command requesting first printer specifications data and applies the command to the printer 20 in the isochronous cycle with the remainder of "0" or "1". When the printer 20 receives the command requesting first printer specifications data, fixed specifications data relating to the printer 20, which specifications include the printing speed of the printer 20 and the storage capacity of the FIFO memory 26, are read out from the ROM 23 by the system controller 21. The fixed specifications data are supplied from the printer 20 to the printer controller 10 in the isochronous cycle with the remainders of "2".

Next, with reference to FIGS. 3a to 4, in the isochronous cycle in which the remainder "0" appears, starting from time t1, the printer controller 10 provides the printer 20 with printer reservation and channel setting data. This printer reservation data is data which sets the printer 20 in such a manner that it will accept transmission of image data from the printer controller 10. This data is written into the RAM 22 of the printer 20. The channel setting data is data for setting a channel number to the printer 20. Data representing the channel number which has been set in accordance with the channel setting data is stored in the register 25C as described above.

The sending and receiving of data or commands by the printer controller 10 and printer 20 thus far is carried out by asynchronous transfer in accordance with the format shown in FIG. 13. It is of course permissible to adopt an arrangement in which isochronous transfer is used. Data transferred following a print standby command, described next, is transferred isochronously.

When the channel number is set, a printer standby command is created in the communication control circuit 13, under the control of the main CPU 11, in accordance with the packet format illustrated in FIG. 14, and the command is transmitted, in the isochronous cycle with the remainder "1" starting from time t2, from the printer controller 10 to the printer 20. When the printer standby command is received by the printer 20, printing preparations such as positioning of the printing paper at the home position begins. When the printing preparations in the printer 20 are completed, in the isochronous cycle with the remainder "2" starting from time t3, data indicative of the completion of printing preparations and of the image data transfer (transmission) request is output by the printer 20 and this data is transmitted to the printer controller 10.

In the printer controller 10, when the data indicative of the completion of printing preparation and of the image data transfer request is received, the transmission data of amount capable of being transferred by one packet is read out of the main memory 12 and fed to the transmission memory 13A included in the communication control circuit 13 to be temporarily stored therein. A packet is produced in accordance with the format illustrated in FIG. 15 in the communication circuit 13. On the other hand, the error flag err in the RAM 22 is reset in the printer 20 (step 31 in FIG. 5a). The image data involved in the packet produced as above is transmitted, in the isochronous cycle with the remainder "0" starting from time t4, from the printer controller 10 to the printer 20 and received by the printer 20 (step 32). In the same way, another packet including image data is transmitted in the isochronous cycle with the remainder "1" starting from time t5.

Data of one packet transmitted from the printer controller 10 is stored temporarily in the reception memory 25B of the communication control circuit 25 in the printer 20. By comparing the data representing the channel number included in the one packet of data with the data representing the channel number stored in the register 25C, the communication control circuit 25 determines whether the data is data that has been transmitted to itself as the destination. If it is determined that the data has been transmitted to itself as the destination, a communication interrupt is generated and the error flag err in the RAM 22 is referred to (step 33).

If the error flag err has not been set (NO at step 33), it is judged whether the header or image data in the received packet includes an error on the basis of the header CRC and data CRC contained in the received packet of image data (step 34). If no error is found in the header and image data (YES at step 34), the image data that has been stored temporarily in the reception memory 25B is written into the FIFO memory 26 (step 37). If an error is found in the header or image data (NO at step 34), the error flag err in the RAM 22 is set (step 35). The received image data is erased from the reception memory 25B (step 36). The processings of steps 32 and 37 are repeated until the remainder which is obtained by dividing the number-of-times of the isochronous cycle by "0" becomes "2" (step 38).

The image data which has been received by the printer 20 and stored in the FIFO memory 26 is read out in accordance with the data request signal from the printer engine 28 and the data is applied to the printer engine 28 via the data processing circuit 27. As a result, the image is printed at a constant speed by the printing head contained in the printer engine 28.

When the remainder "2" is obtained by dividing the number-of-times of the isochronous cycles by "3", the printer 20 is allowed to transmit data to the printer controller 10 (step 38). It is judged whether all the image data which represent an image to be printed by the printer 20 have been received (step 39 in FIG. 5b), when the remainder "2", is obtained.

If the reception of all the image data has not been completed (NO at step 39), it is judged whether a printing error occurs (step 40). If the error has occurred (YES at step 40), a transfer (transmission) stop request is transmitted to the printer controller 10 from the printer 20 (step 41, time t27 in FIG. 3b).

If the printing error does not occur (NO at step 40), the error flag err in RAM 22 is referred to (step 42). In a case where the error flag err is set (YES at step 42), the image data which includes an error has been erased (step 36), so that a printing error would occur because of lack of image data. In order to prevent a printing error from occurring, a command requesting for retransmitting the same image data as that has included the error (image data repeat request command) is transmitted from the printer 20 to the printer controller 10 (step 43, time t15 in FIG. 3b).

If the error flag err is not set (NO at step 42), it is judged whether data amount of image data which is stored in the FIFO memory 26 exceeds a predetermined amount (step 44).

If the image data stored in the FIFO memory 26 is larger than the predetermined value in amount (YES at step 44), the FIFO memory 26 will not be empty, even if the image printing is continued at the constant printing speed (the predetermined amount is so determined that the FIFO memory 26 will not be empty). Accordingly, a null data transfer (transmission) request is sent to the printer controller 10 from the printer 20 (step 45, times t6, t9, t18 and t24) in FIGS. 3a and 3b). In response to the null data transfer request, the printer controller 10 transmits null data packets which include no image data to the printer 20 in the isochronous cycles with the remainders "0" and "1" (times t7, t8, t10, t11, t19, t20, t25 and t26 in FIGS. 3a and 3b).

When the data amount of the image data stored in the FIFO memory 26 is less than the predetermined amount (NO at step 44), there is a possibility that the FIFO memory 26 becomes empty, if the image printing is continued at a constant printing speed, which leads an occurrence of printing error. In such a case, a command requesting for transmitting image data (image data transfer request) is sent from the printer 20 to the printer controller 10 (step 46, times t12 and t21 in FIG. 3b). In response to this image data transfer request, the printer controller 10 transmits image data to the printer 20 in the isochronous cycles with the remainders "0" and "1" (times t13, t14, t22 and t23 in FIGS. 3a and 3b).

As described above, the image data is transmitted from the printer controller 10 to the printer 20 in such a manner that the image data that has been stored in the FIFO memory 26 will not be emptied therefrom. Occurrence of a printing error can be prevented, even if the printer 20 is a printer which prints an image at a constant speed and the FIFO memory 26 is a memory which does not have a storage capacity capable of storing one frame of image data.

Time when the printer 20 is allowed to transmit data (transmission-permitted time period for printer) and time when the printer controller 10 is allowed to transmit data (transmission-permitted time period for printer controller) are separated from each other, so that the same channel number can be assigned to both the printer 20 and the printer controller 10 without occurrence of confusion, that is, bidirectional data transmission can be achieved using one channel.

In the above embodiment, since one printer 20 is connected to one printer controller 10, the one printer 20 and the one printer controller 10 can exclusively use the whole period of the isochronous cycle. The amount of image data which is transmitted from the printer controller 10 to the printer 20 can be increased to the extent of being permitted in the isochronous transfer. The transfer speed of the image data is enhanced.

FIGS. 6a to 8b illustrate another embodiment. The constructions of the printer controller 10 and the printer 20 are the same as those shown in FIGS. 1 and 2.

Figure 6B:
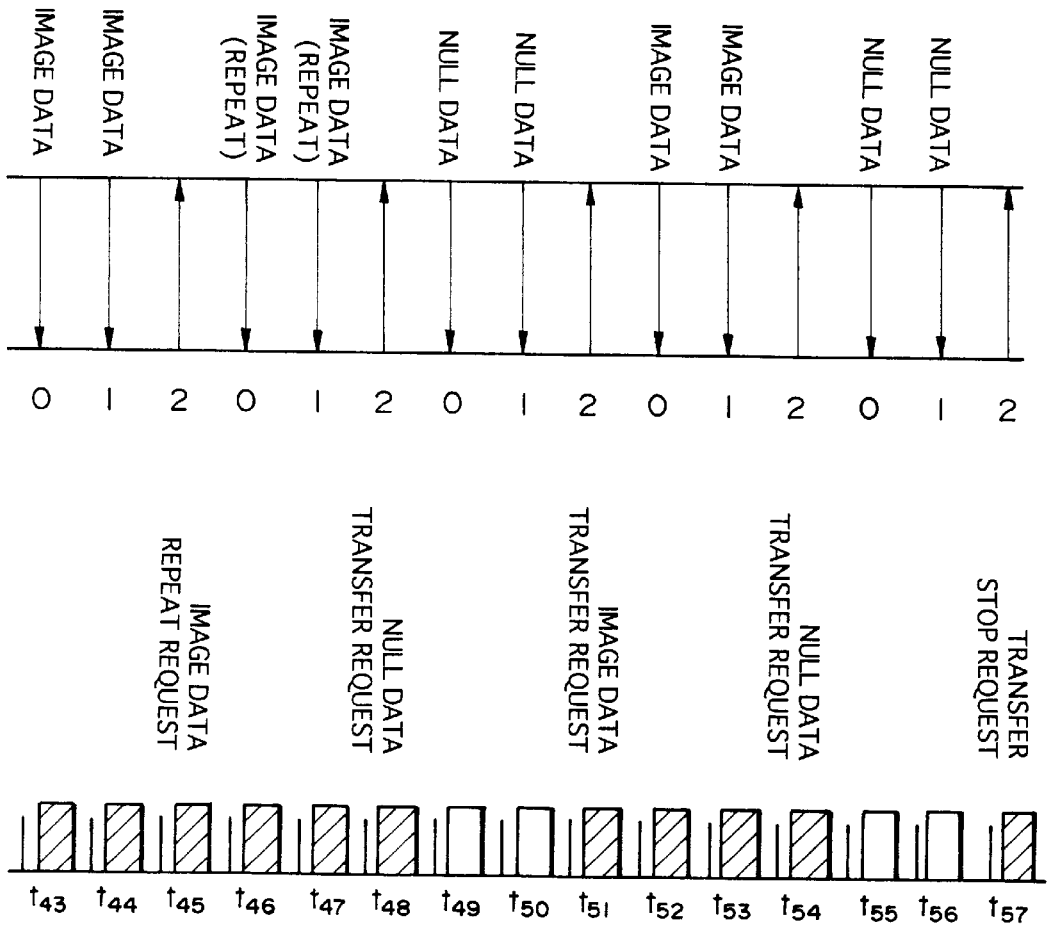
Figure 7:
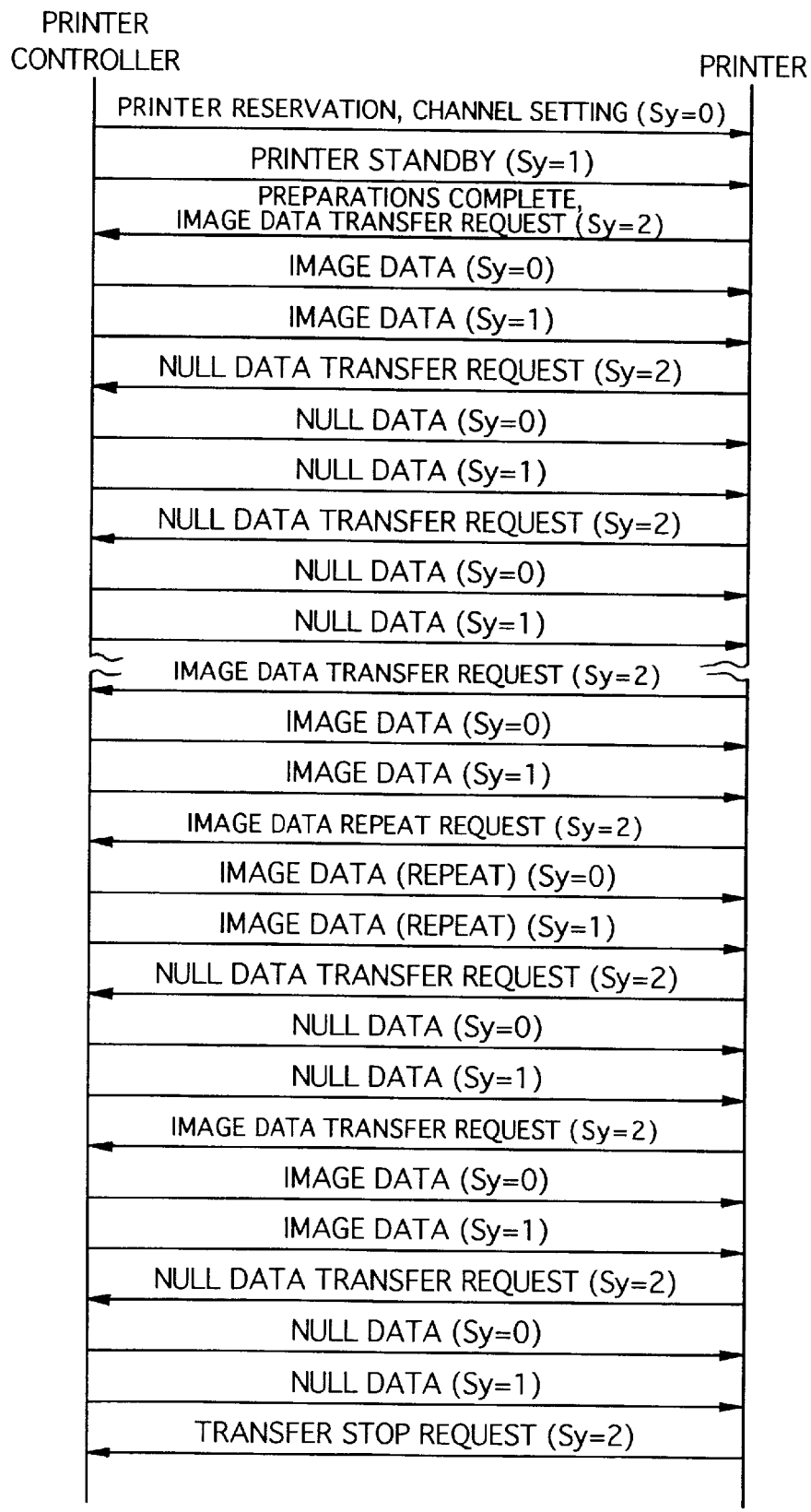
FIG. 7 illustrates commands and data sent and received by the printer controller and printer in a case where image data is transmitted from the printer controller to the printer.
Figure 8A:
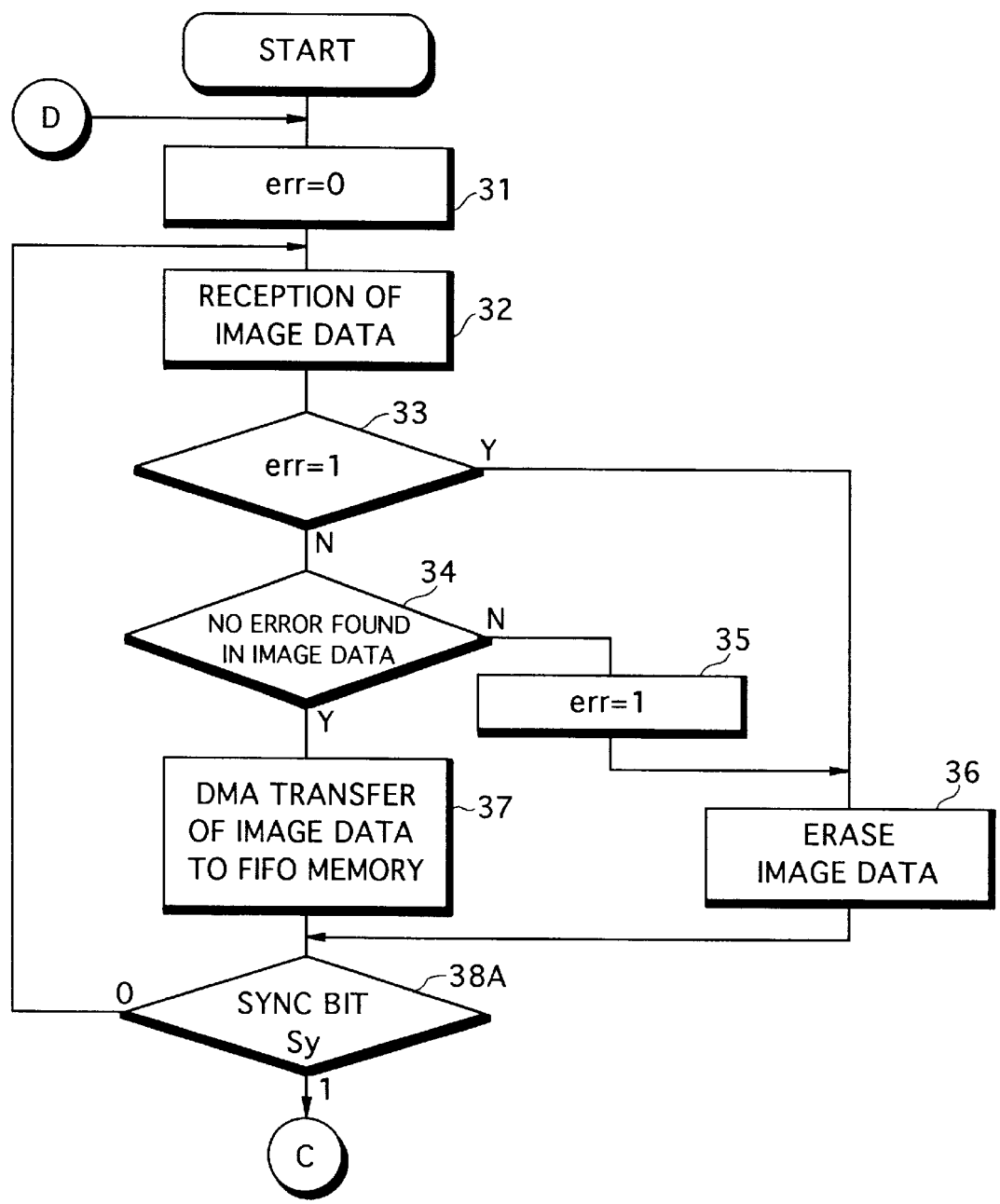
FIGS. 8a and 8b are flow charts showing an operation of the printer when image data is transmitted from the printer controller to the printer.
Figure 8B:
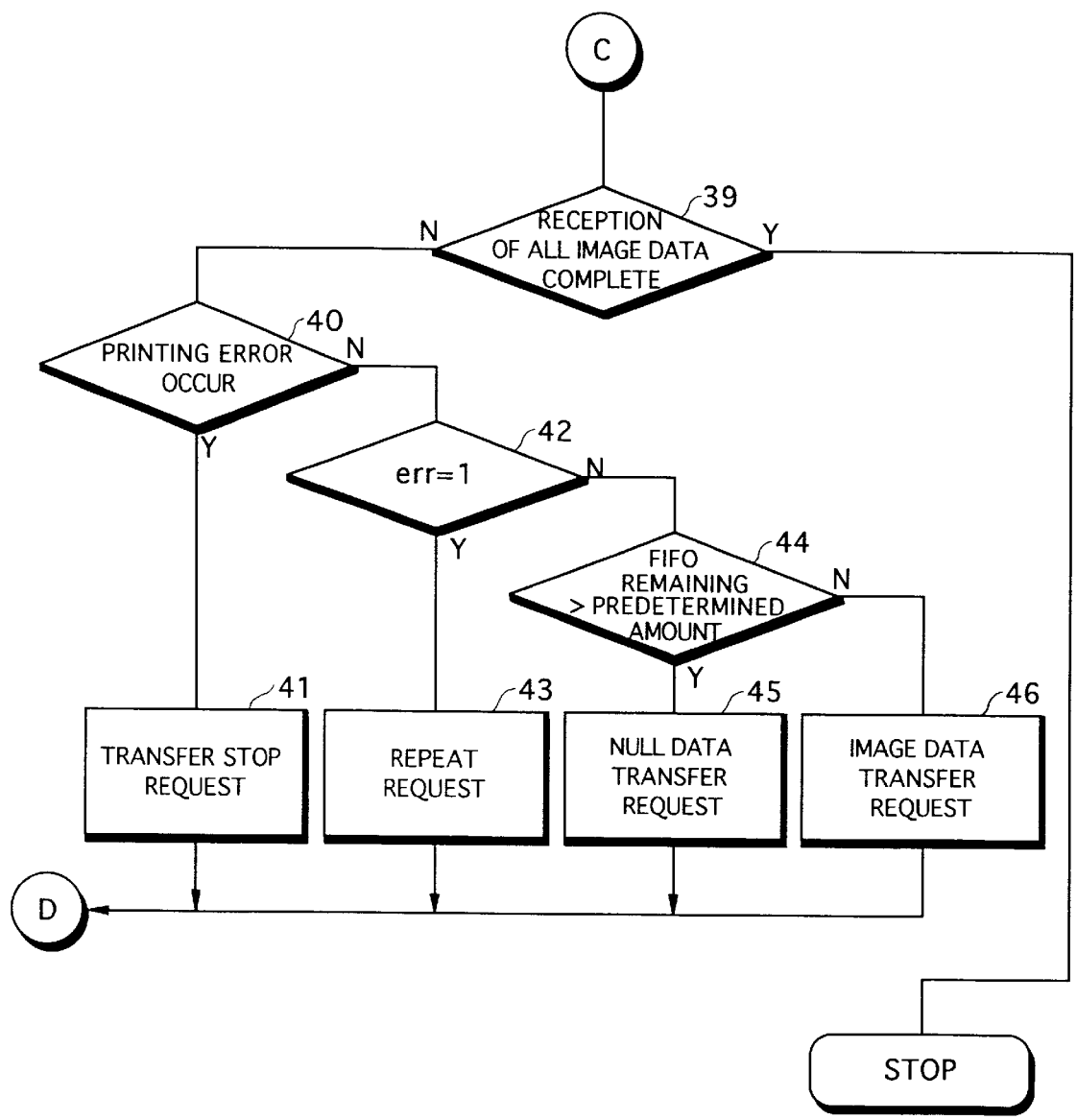

FIGS. 6a and 6b are time charts for a case in which image data is transmitted from the printer controller 10 to the printer 20 in response to a transfer request from the printer 20, and FIG. 7 illustrates the manner in which commands and data are sent and received by the printer controller 10 and printer 20. FIGS. 8a and 8b are flow charts showing an operation of the printer 20 when the image data is transmitted from the printer controller 10, in which the same reference numerals as in FIGS. 5a and 5b are assigned to the same processings to omit the overlapped explanation.

In the above embodiment shown in FIGS. 3a to 5b, the bidirectional data communication between the printer controller 10 and the printer 20 is determined in such a way that the printer controller 10 transmits data to the printer 20 when the remainder "0" or "1" is obtained by dividing the number-of-times of isochronous cycles by "3", and that the printer 20 transmits data to the printer controller 10 when the remainder "2" is obtained.

In the embodiment shown in FIGS. 6a to 8b, time when the printer controller 10 transmits data to the printer 20 and time when the printer 20 transmits data to the printer controller 10 are determined by utilizing the synchronizing (sync) bit Sy in the isochronous command packet format (FIG. 14) and the isochronous data packet format (FIG. 15).

More specifically, the sync bit is set to "0" or "1", when the printer controller 10 transmits data to the printer 20 by the isochronous transfer. The sync bit "0" is used when the printer controller 10 transmits data in not only the present isochronous cycle but also the next isochronous cycle. The printer 20 which has received the data accompanied by the sync bit "0" recognizes the data transmission from the printer controller 10 will still continue. The sync bit "1" is used when the printer controller 10 will pause the data transmission to the printer 20. Upon receiving the data accompanied by the sync bit "1", the printer 20 recognizes that the data transmission from the printer controller 10 to the printer 20 is stopped and the printer 20 is allowed to transmit data (request) to the printer controller 10 in the next isochronous cycle. The sync bit is set to "2" when the printer 20 transmits data to the printer controller 10. Upon receiving data transmitted from the printer 20 and accompanied by the sync bit "2", the printer controller 10 recognizes that data transmission from the printer 20 ceases and the printer controller 10 can transmit data to the printer 20 in the next isochronous cycle.

With reference to FIGS. 6*a* to 7, when the printer controller 10 transmits data to the printer 20, the sync bit Sy accompanying the transmitted data is set to "0" or "1", in which the sync bit "1" is used when the printer controller 10 will pause the data transmission to the printer 20.

Upon receiving data transmitted from the printer controller 10 and accompanied by the sync bit "1" (step 38A in FIG. 8*a*), the printer 20 transmits data (request command) (the sync bit Sy is set to "2" in the packet which includes the transmission data) to the printer controller 10 in the next isochronous cycle. That is, transmitted from the printer 20 to the printer controller 10 are data of the preparation completion and image data transfer request command (time t33 in FIG. 6*a*), an image data transfer request command (time 42 in FIG. 6*b*), a null data transfer request command (time t36, t39, t48 and t54 in FIGS. 6*a* and 6*b*), an image data repeat request command (time t45 in FIG. 6*b*), a transfer stop request command (time t57 in FIG. 6*b*). In response to one of the above request commands, the printer controller 10 transmits null data or image data, or stops data transmission.

In the embodiment shown in FIGS. 6*a* to 8*b*, it can be also realized that the printer controller 10 transmits image data to the printer 20 in such a way that the image data which has been stored in the FIFO memory 26 will not be emptied therefrom, and that a printing error is prevented from occurring even if the printer 20 performs a constant speed printing and the FIFO memory 26 does not have sufficient storage capacity to store image data of one frame image.

Time when the printer controller 10 is allowed to transmit data and time when the printer 20 is allowed to transmit data are separated from each other, the same channel number is assigned to both the printer controller 10 and the printer 20.

Since the printer controller 10 and the printer 20 do not transmit data at the same time, the bidirectional communication can be realized therebetween, even if the same channel number is assigned thereto.

As many apparently widely different embodiments of the present invention can be made without departing from the spirit and scope thereof, it is to be understood that the invention is not limited to the specific embodiments thereof except as defined in the appended claims.

What is claimed is:

1. A printer system comprising:
   a printer controller; and
   a printer, connected to the printer controller by a bus, wherein said printer controller and said printer each accepts data transmitted thereto when device identification data assigned thereto agrees with transmission destination identifying data accompanying the transmitted data,
   said printer controller and said printer being assigned identical device identification data and determining a first transmission-permitted time period in which said printer controller transmits data to said printer and a second transmission-permitted time period in which said printer transmits data to said printer controller, the first and second transmission-permitted time periods being separated from each other,
   said printer controller including,
      an image-data transmission controller transmitting image data accompanied by the transmission destination identifying data to said printer in packet units in the first transmission-permitted time period, and
   said printer including,
      a data transmission controller transmitting data accompanied by the transmission destination identifying data to said printer controller in the second transmission-permitted time period;
      an image data reception controller receiving the image data transmitted from said printer controller;
      a buffer memory temporarily storing the image data received by said image data reception controller; and
      a printing controller reading out the image data that has been stored in said buffer memory, and printing an image which is represented by the read-out image data.

2. The printer system according to claim 1, wherein the device identification data and the transmission destination identifying data include a channel number used in isochronous transfer.

3. The printer system according to claim 1, wherein said printer controller and said printer count a number of cycles for each predetermined communication cycle from a predetermined time and respectively determine the first and the second transmission-permitted time periods based on the counted number of cycles.

4. The printer system according to claim 3, wherein said printer controller and said printer determine the first and the second transmission-permitted time periods based on a remainder obtained by dividing the counted number of cycles by a predetermined number.

5. The printer system according to claim 1, wherein said image-data transmission controller of said printer controller controls the transmission of the image data based on data sent from said data transmission controller of said printer.

6. The printer system according to claim 5, wherein said image-data transmission controller of said printer controller re-transmits the image data which has been transmitted to said printer on time in response to an image data repeat request sent from said data transmission controller of said printer.

7. The printer system according to claim 5, wherein said image-data transmission controller of said printer controller transmits image data in response to an image data transfer request sent from said data transmission controller of said printer.

8. The printer system according to claim 5, wherein said image-data transmission controller of said printer controller stops transmission of image data in response to an image data transfer stop request sent from said data transmission controller of said printer.

9. The printer system according to claim 5, wherein said image-data transmission controller of said printer controller transmits null data in response to a null data transfer request sent from said data transmission controller of said printer.

10. The printer system according to claim 1, wherein said image-data transmission controller of said printer controller transmits first sync data, indicating that transmission of image data will be stopped, when said image-data transmission controller pauses to transmit image data;

said data transmission controller of said printer transmits second sync data, indicating that transmission of data will be stopped when said data transmission controller pauses to transmit data;

said data transmission controller of said printer determines the second transmission-permitted time period in such a way that said data transmission controller starts to transmit data in response to the first sync data; and said image-data transmission controller of said printer controller determines the first transmission-permitted time period in such a way that said image-data transmission controller starts to transmit image data in response to the second sync data.

11. A printer system comprising:

a printer controller; and a printer, connected to the printer controller by a bus, wherein said printer controller and said printer each accepts data transmitted thereto when device identification data assigned thereto agrees with transmission destination identifying data accompanying the transmitted data, said printer controller and said printer being assigned identical device identification data, and determining a first transmission-permitted time period in which said printer and a second transmission-permitted time period in which said printer transmits data to said printer controller, the first and second transmission-permitted time periods being separated from each other, said printer controller including, an image-data transmission controller transmitting image data accompanied by the transmission destination identifying data to said printer in packet units in the first transmission-permitted time period, and said printer including, a data transmission controller transmitting data accompanied by the transmission destination identifying data to said printer controller in the second transmission-permitted time period;

an image data reception controller receiving the image data transmitted from said printer controller;

a buffer memory temporarily storing the image data received by said image data reception controller; and a printing controller reading out the image data that has been stored in said buffer memory, and printing an image which is represented by the read-out image data, wherein the device identification data and the transmission destination identifying data include a channel number used in isochronous transfer wherein said buffer memory of said printer possess an image-data storage capacity smaller than a quantity of image data representing one frame of the image.

12. A printer system comprising:

a printer controller; and a printer, connected to the printer controller by a bus, wherein said printer controller and said printer each accepts data transmitted thereto when device identification data assigned thereto agrees with transmission destination identifying data accompanying the transmitted data, said printer controller and said printer being assigned identical device identification data, and determining a first transmission-permitted time period in which said printer and a second transmission-permitted time period in which said printer transmits data to said printer controller, the first and second transmission-permitted time periods being separated from each other, said printer controller including, an image-data transmission controller transmitting image data accompanied by the transmission destination identifying data to said printer in packet units in the first transmission-permitted time period, and said printer including, a data transmission controller transmitting data accompanied by the transmission destination identifying data to said printer controller in the second transmission-permitted time period;

an image data reception controller receiving the image data transmitted from said printer controller;

a buffer memory temporarily storing the image data received by said image data reception controller; and a printing controller reading out the image data that has been stored in said buffer memory, and printing an image which is represented by the read-out image data wherein the device identification data and the transmission destination identifying data include a channel number used in isochronous transfer wherein said image-data transmission controller repeats transmission of image data to said printer in packet units in such a manner that the image data that has been stored in said buffer memory will not be emptied from said buffer memory, and said printing controller reads out the image data that has been stored in said buffer memory, and prints the image, which is represented by the read-out image data, at a constant speed.

13. A printer controller, used in a printer system which includes the printer controller and a printer connected to each other by a bus, said printer controller comprising:

an image-data transmission controller transmitting image data accompanied by the transmission destination identifying data to said printer in packet units in the first transmission-permitted time period, wherein said printer controller and said printer each accepts data transmitted thereto when device identification data assigned thereto agrees with transmission destination identifying data accompanying the transmitted data, said printer controller and said printer being assigned identical device identification data, and determining a first transmission-permitted time period in which said printer controller transmits data to said printer and a second transmission-permitted time period in which said printer transmits data to said printer controller, the first and second transmission-permitted time periods being separated from each other.

14. A printer, used in a printer system which includes a printer controller and said printer connected to each other by a bus, comprising:
- a data transmission controller transmitting data accompanied by the transmission destination identifying data to said printer controller in the second transmission-permitted time period;
- an image data reception controller receiving the image data transmitted from said printer controller;
- a buffer memory temporarily storing the image data received by said image data reception controller; and
- a printing controller reading out the image data that has been stored in said buffer memory, and printing an image which is represented by the read-out image data, wherein said printer controller and said printer each accepts data transmitted thereto when device identification data assigned thereto agrees with transmission destination identifying data accompanying the transmitted data, said printer controller and said printer being assigned identical device identification data, and determining a first transmission-permitted time period in which said printer controller transmits data to said printer and a second transmission-permitted time period in which said printer transmits data to said printer controller, the first and second transmission-permitted time periods being separated from each other.

15. A method of controlling operation of a printer system including a printer controller and a printer connected to each other by a bus, wherein said printer controller and said printer each accepts data transmitted thereto when device identification data assigned thereto agrees with transmission destination identifying data accompanying the transmitted data, comprising the steps of:
- assigning identical device identification data to said printer controller and said printer;
- determining a first transmission-permitted time period in which said printer controller transmits data to said printer and a second transmission-permitted time period in which said printer transmits data to said printer controller, the first and second transmission-permitted time periods being separated from each other;
- causing said printer controller to transmit image data accompanied by the transmission destination identifying data to said printer in packet units in the first transmission-permitted time period; and
- causing said printer to transmit data accompanied by the transmission destination identifying data to said printer controller in the second transmission-permitted time period,
  - causing the printer to receive the image data transmitted from said printer controller to store temporarily the received image data into a buffer memory, and
  - causing the printer to read out the image data that has been stored in said buffer memory, and to print an image which is represented by the read-out image data.

16. The method according to claim 15, further comprising the step of adopting a channel number used in isochronous transfer as the device identification data and the transmission destination identifying data.

17. The method according to claim 15, further comprising the step of causing said printer controller and said printer to count a number of cycles for each predetermined communication cycle from predetermined time and determine the first and the second transmission-permitted time periods based on the counted numbers of cycles, respectively.

18. The method according to claim 17, further comprising the step of causing said printer controller and said printer to determine the first and the second transmission-permitted time periods based on a remainder obtained by dividing the counted number of cycles by a predetermined number.

19. The method according to claim 15, further comprising the step of causing said printer controller to control the transmission of the image data based on data sent from said printer.

20. The method according to claim 19, further comprising the step of causing said printer controller to re-transmit the image data, which has been transmitted to said printer once, in response to an image data repeat request sent from said printer.

21. The method according to claim 19, further comprising the step of causing said printer controller to transmit image data in response to an image data transfer request sent from said printer.

22. The method according to claim 19, further comprising the step of causing said printer controller to stop transmission of image data in response to an image data transfer stop request sent from said printer.

23. The method according to claim 19, further comprising the step of causing said printer controller to transmit null data in response to a null data transfer request sent from said printer.

24. The method according to claim 15, further comprising the steps of:
- causing said printer controller to transmit first sync data indicating that transmission of image data will be stopped when said printer controller pauses to transmit image data;
- causing said printer to transmit second sync data indicating that transmission of data will be stopped when said printer pauses to transmit data;
- causing said printer to determine the second transmission-permitted time period in such a way that said printer starts to transmit data in response to the first sync data; and
- causing said printer controller to determine the first transmission-permitted time period in such a way that said printer controller starts to transmit image data in response to the second sync data.

25. A method of controlling operation of a printer system including a printer controller and a printer connected to each other by a bus, wherein said printer controller and said printer each accepts data transmitted thereto when device identification data assigned thereto agrees with transmission destination identifying data accompanying the transmitted data, comprising the steps of:
- assigning identical device identification data to said printer controller and said printer;
- determining a first transmission-permitted time period in which said printer controller transmits data to said printer and a second transmission-permitted time period in which said printer transmits data to said printer controller, the first and second transmission-permitted time periods being separated from each other;
- causing said printer controller to transmit image data accompanied by the transmission destination identifying data to said printer in packet units in the first transmission-permitted time period; and
- causing said printer to transmit data accompanied by the transmission destination identifying data to said printer controller in the second transmission-permitted time period, causing the printer to receive the image data transmitted from said printer controller to store temporarily the received image data into a buffer memory, and causing the printer to read out the image data that has been stored in said buffer memory, and to print an image which is represented by the read-out image data, and further comprising the steps of adopting a channel number used in isochronous transfer as the device identification data and the transmission destination identifying data, and using such a buffer memory in said printer that possesses an image-data storage capacity smaller than a quantity of image data representing one frame of the image.

26. A method of controlling operation of a printer system including a printer controller and a printer connected to each other by a bus, wherein said printer controller and said printer each accepts data transmitted thereto when device identification data assigned thereto agrees with transmission destination identifying data accompanying the transmitted data, comprising the steps of:

assigning identical device identification data to said printer controller and said printer;

determining a first transmission-permitted time period in which said printer controller transmits data to said printer and a second transmission-permitted time period in which said printer transmits data to said printer controller, the first and second transmission-permitted time periods being separated from each other;

causing said printer controller to transmit image data accompanied by the transmission destination identifying data to said printer in packet units in the first transmission-permitted time period; and causing said printer to transmit data accompanied by the transmission destination identifying data to said printer controller in the second transmission-permitted time period causing the printer to receive the image data transmitted from said printer controller to store temporarily the received image data into a buffer memory, and causing the printer to read out the image data that has been stored in said buffer memory, and to print an image which is represented by the read-out image data, and further comprising the steps of:

adopting a channel number used in isochronous transfer as the device identification data and the transmission destination identifying data causing said printer controller to repeat transmission of image data to said printer in packet units in such a manner that the image data that has been stored in said buffer memory will not be emptied from said buffer memory, and causing said printer to read out the image data that has been stored in said buffer memory, and to print the image, which is represented by the read-out image data, at a constant speed.

27. A method of controlling operation of a printer controller used in a printer system, which includes said printer controller and a printer connected to each other by a bus, the method comprising:

causing said printer controller to transmit image data accompanied by the transmission destination identifying data to said printer in packet units in the first transmission-permitted time period, wherein said printer and said printer controller and said printer each accepts data transmitted thereto when device identification data assigned thereto agrees with transmission destination identifying data accompanying the transmitted data, said printer controller and said printer being assigned identical device identification data, and determining a first transmission-permitted time period in which said printer controller transmits data to said printer and a second transmission-permitted time period in which said printer transmits data to said printer controller, the first and second transmission-permitted time periods being separated from each other.

28. A method of controlling operation of a printer used in a printer system, which includes a printer controller and said printer connected to each other by a bus, the method comprising:

causing said printer to transmit data accompanied by the transmission destination identifying data to said printer controller in the second transmission-permitted time period;

causing the printer to receive the image data transmitted from said printer controller to temporarily store the received image data into a buffer memory; and causing the printer to read out the image data that has been stored in said buffer memory, and to print an image which is represented by the read-out image data, wherein said printer controller and said printer each accepts data transmitted thereto when device identification data assigned thereto agrees with transmission destination identifying data accompanying the transmitted data, said printer controller and said printer being assigned identical device identification data, and determining a first transmission-permitted time period in which said printer controller transmits data to said printer and a second transmission-permitted time period in which said printer transmits data to said printer controller, the first and second transmission-permitted time periods being separated from each other.

29. A system comprising:

a first device; and a second device connected to the first device, wherein said first and second devices each accepts data transmitted thereto when device identification data assigned thereto agrees with transmission destination identifying data accompanying the transmitted data, said first device and said second device being assigned identical device identification data, and determining a first transmission-permitted time period in which said first device transmits data to said second device and a second transmission-permitted time period in which said second device transmits data to said first device, the first and second transmission-permitted time periods being separated from each other, said first device controller including, a data transmission controller transmitting data accompanied by the transmission destination identifying data to said second device in the first transmission-permitted time period, and said second device including, a data transmission controller transmitting data accompanied by the transmission destination identifying data to said first device in the second transmission-permitted time period.

* * * * *